US012726717B2

(12) United States Patent
Fortin-Deschenes et al.

(10) Patent No.: US 12,726,717 B2
(45) Date of Patent: Sep. 1, 2026

(54) HEAD-MOUNTED DEVICE WITH FLICKER JUDDER MITIGATION

(71) Applicant: Apple Inc., Cupertino, CA (US)

(72) Inventors: Simon Fortin-Deschenes, Santa Clara, CA (US); Christophe Seyve, Saratoga, CA (US); Seyedkoosha Mirhosseini, Santa Clara, CA (US); Luke A Pillans, San Diego, CA (US); Christian I Moore, Sunnyvale, CA (US); Hengzhou Ding, Cupertino, CA (US); Cheng-Sheng Hsu, San Jose, CA (US); Colin D Munro, San Jose, CA (US); Joseph Cheung, San Jose, CA (US); Moshe H Malkin, Palo Alto, CA (US); Russell L Jones, Westminster, CO (US); Saul H Weiss, Parker, CO (US); Marc Osswald, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 18/675,635

(22) Filed: May 28, 2024

(65) Prior Publication Data

US 2025/0247627 A1 Jul. 31, 2025

Related U.S. Application Data

(60) Provisional application No. 63/625,843, filed on Jan. 26, 2024.

(51) Int. Cl.

*H04N 23/745* (2023.01)
*G09G 3/00* (2006.01)

(Continued)

(52) U.S. Cl.

CPC .......... *H04N 23/745* (2023.01); *G09G 3/001* (2013.01); *H04N 23/667* (2023.01); *H04N 23/71* (2023.01);

(Continued)

(58) Field of Classification Search

CPC .... H04N 23/745; H04N 23/667; H04N 23/71; H04N 23/72; H04N 23/73; H04N 25/532;

(Continued)

(56) References Cited

U.S. PATENT DOCUMENTS

| | | | | |
|---|---|---|---|---|
| 8,804,004 | B2 * | 8/2014 | Kato | H04N 23/745 348/226.1 |
| 9,794,492 | B2 | 10/2017 | Aoyama | |

(Continued)

*Primary Examiner* — Ahmed A Berhan

(74) *Attorney, Agent, or Firm* — Treyz Law Group; Jason Tsai

(57) ABSTRACT

A method of operating an electronic device such as a head-mounted device to mitigate judder, double images, ghosting, and other display artifacts is provided. The method can include acquiring images of a scene with one or more cameras, outputting the acquired images of the scene with one or more displays, sensing light in the scene with a flicker sensor, obtaining a frequency and a phase of the sensed light, and setting or locking a frame rate of the cameras based on the frequency of the sensed light. The method can also include shifting or locking exposure periods of the cameras based on the phase of the sensed light. Determination of whether judder is present can involve computing a display artifact severity parameter and comparing that parameter to a threshold.

26 Claims, 15 Drawing Sheets

(51) Int. Cl.

| | |
|---|---|
| ***H04N 23/667*** | (2023.01) |
| ***H04N 23/71*** | (2023.01) |
| ***H04N 23/72*** | (2023.01) |
| ***H04N 23/73*** | (2023.01) |
| ***H04N 25/532*** | (2023.01) |

(52) U.S. Cl.

CPC ............. *H04N 23/72* (2023.01); *H04N 23/73* (2023.01); *H04N 25/532* (2023.01); *G09G 2320/0247* (2013.01); *G09G 2340/0435* (2013.01)

(58) Field of Classification Search

CPC ........... G09G 3/001; G09G 2320/0247; G09G 2340/0435

See application file for complete search history.

(56) References Cited

U.S. PATENT DOCUMENTS

| | | | | |
|---|---|---|---|---|
| 10,097,813 | B2 * | 10/2018 | Stenger | H04N 13/128 |
| 2010/0026820 | A1 * | 2/2010 | Senoo | H04N 23/683 348/E5.037 |
| 2011/0267506 | A1 | 11/2011 | Klijn et al. | |
| 2012/0057046 | A1 * | 3/2012 | Tanaka | H04N 23/745 348/E5.037 |
| 2021/0377436 | A1 | 12/2021 | Sugawara et al. | |
| 2022/0272251 | A1 * | 8/2022 | Kobayashi | H04N 23/73 |
| 2023/0061655 | A1 * | 3/2023 | Kobayashi | H04N 23/73 |

* cited by examiner

Light Source
222
Max'
A2
Min'
Time

HEAD-MOUNTED DEVICE WITH FLICKER JUDDER MITIGATION

This application claims the benefit of U.S. Provisional Patent Application No. 63/625,843, filed Jan. 26, 2024, which is hereby incorporated by reference herein in its entirety.

FIELD

This relates generally to electronic devices, and, more particularly, to electronic devices such as head-mounted devices.

BACKGROUND

Electronic devices such as head-mounted devices can have cameras for obtaining a live video feed of a physical environment and one or more displays for presenting the live video feed to a user. The physical environment can include one or more light sources.

The cameras can acquire images for the live video feed at some frame rate. The displays can output the live video feed at some frame rate. The light sources can be modulated at some frequency that is different than the frame rate of the cameras and displays. If care is not taken, the light sources in the environment can result in noticeable judder in the live video feed. It is within such context that the embodiments herein arise.

SUMMARY

An aspect of the disclosure provides a method of operating an electronic device such as a head-mounted device. The method can include: with one or more image sensors, acquiring images of a scene; with one or more displays, outputting the acquired images of the scene; with a flicker sensor, sensing light in the scene; obtaining a frequency of the sensed light; and setting a frame rate of the one or more image sensors based on the frequency of the sensed light. The method can optionally include setting a frame rate of the one or more displays based on the frequency of the sensed light. The method can optionally include obtaining a phase of the sensed light and shifting exposure periods of the one or more image sensors based on the phase of the sensed light. The method can further include adjusting a duration of the exposure periods based on the frequency of the sensed light to reduce banding in the images being output on the one or more displays.

An aspect of the disclosure provides a method of operating an electronic device that includes: with one or more image sensors, acquiring images of a scene; with one or more displays, outputting the acquired images of the scene; with a flicker sensor, sensing light in the scene; obtaining a frequency of the sensed light; computing a display artifact severity parameter based on at least the frequency of the sensed light and comparing the display artifact severity parameter to a threshold; and in response to determining that the display artifact severity parameter exceeds the threshold, mitigating judder by adjusting a frame rate of the one or more image sensors. The method can optionally further include: adjusting a frame rate of the one or more displays in response to determining that the display artifact severity parameter exceeds the threshold; adjusting a duration of exposure periods of the one or more image sensors based on the frequency of the sensed light to reduce banding in the images being output on the one or more displays; operating the electronic device in a first mode during which the frame rate of the one or more image sensors is set to a first frequency in response to determining that the display artifact severity parameter is less than the threshold; and operating the electronic device in a second mode during which the frame rate of the one or more image sensors is set to a second frequency that is different than the first frequency in response to determining that the display artifact severity parameter is greater than the threshold.

An aspect of the disclosure provides a method of operating an electronic device that includes: with a flicker sensor, sensing light in a scene, the light exhibiting a waveform having a first frequency; with one or more image sensors, acquiring images of the scene by aligning sensor exposure periods to certain portions of the waveform; and reading out the images from the one or more image sensors at a second frequency that is different than the first frequency. The method can include aligning the sensor exposure periods to peaks, rising edges, or falling edges of the waveform. The waveform can exhibit a pulse width that is greater than a duration of each of the sensor exposure periods, and the second frequency can be less than the first frequency. The one or more image sensors can include one or more global shutter image sensors, and reading out the images from the one or more image sensors can include reading out the images on a row-by-row basis.

An aspect of the disclosure provides a method of operating an electronic device that includes: with one or more image sensors, acquiring images of a scene; with one or more displays, outputting the acquired images of the scene; detecting a frequency of a first light source in the scene; detecting a frequency of a second light source in the scene; mitigating flicker associated with the first light source by performing an operation of a first type; and mitigating flicker associated with the second light source by performing an operation of a second type different than the first type. Performing the operation of the first type can include adjusting a frame rate of the one or more image sensors based on the detected frequency of the first light source. Performing the operation of the first type can include performing frequency and phase locking operations based on the frequency and a phase of the first light source. Performing the operation of the second type can adjusting an exposure time of the one or more image sensors based on the detected frequency of the second light source. The method can further include detecting a frequency of one or more additional light sources in the scene and mitigating flicker associated with the additional light source(s) by performing an operation of the first type or the second type.

DETAILED DESCRIPTION

An electronic device such as a head-mounted device can be mounted on a user's head and may have a front face that faces away from the user's head and an opposing rear face that faces the user's head. One or more sensors on the front face of the device, sometimes referred to as front-facing cameras, may be used to obtain a live passthrough video stream of the external physical environment. One or more displays on the rear face of the device may be used to present the live passthrough video stream to the user's eyes.

A physical environment refers to a real-world environment that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Light sources in the physical environment can be modulated at different frequencies. Light sources having modulation frequencies close to the operating frequency of the front-facing cameras can result in the user seeing judder and double images. The electronic device may include hardware and software subsystems configured to detect judder or to estimate a severity or likelihood of judder. Seeing judder and double images can cause the user to experience motion sickness. Thus, in response to detecting situations where a user would experience a noticeable amount of judder, the electronic device can proactively mitigate judder by dynamically adjusting a system frame rate (e.g., to adjust a frame rate of the front-facing cameras and/or a frame rate of the displays), adjusting an exposure time of the front-facing cameras, performing frequency and phase locking (e.g., to lock the system frame rate to some integer ratio of the frequency of the judder-causing light source and/or to align pulses in the judder-causing light source to the center of each camera exposure period), and/or to optionally alert the user of such judder. Operating an electronic device in this way can be technically advantageous and beneficial to mitigate judder, double images, and ghosting in the live passthrough video feed.

Figure 1:
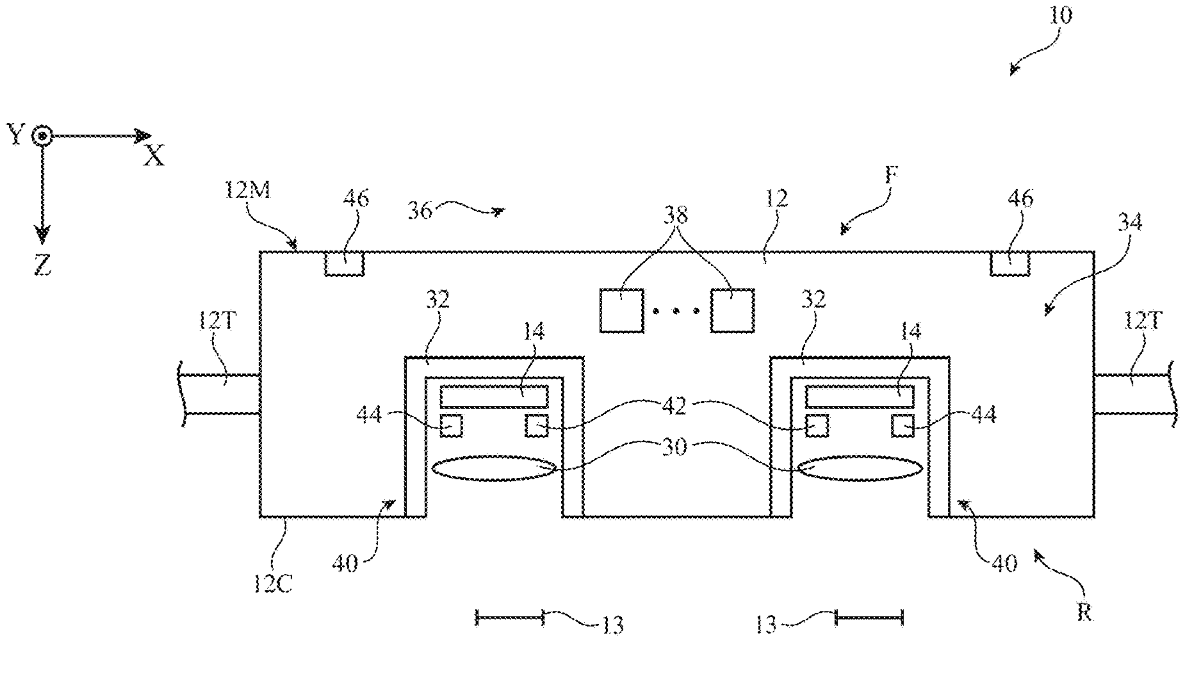
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
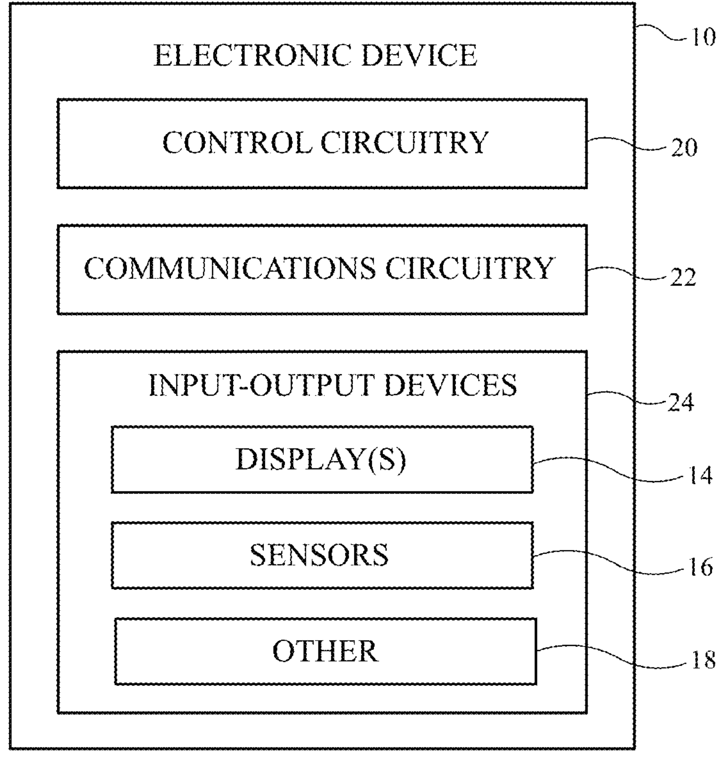
FIG. 2 is a schematic diagram of an illustrative electronic device in accordance with some embodiments.

A schematic diagram of an illustrative electronic device such as a head-mounted device or other wearable device is shown in FIG. 2. Device 10 of FIG. 2 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. In one scenario, the user might be reading static content in a web browser on display 14. In another scenario, the user might be viewing dynamic content such as movie content in a web browser or a media player on display 14. In another scenario, the user might be viewing video game (gaming) content on display 14. In another scenario, the user might be viewing a live feed of the environment surrounding device 10 that is captured using the one or more front-facing camera(s) 46. If desired, computer-generated (virtual) content can be overlaid on top of one or more portions of the live feed presented on display 14. In another scenario, the user might be viewing a live event recorded elsewhere (e.g., at a location different than the location of the user) on display 14. In another scenario, the user might be conducting a video conference (a live meeting) using device 10 while viewing participants and/or any shared meeting content on display 14. These examples are merely illustrative. In general, display 14 can be used to output any type of image or video content.

Figure 3:
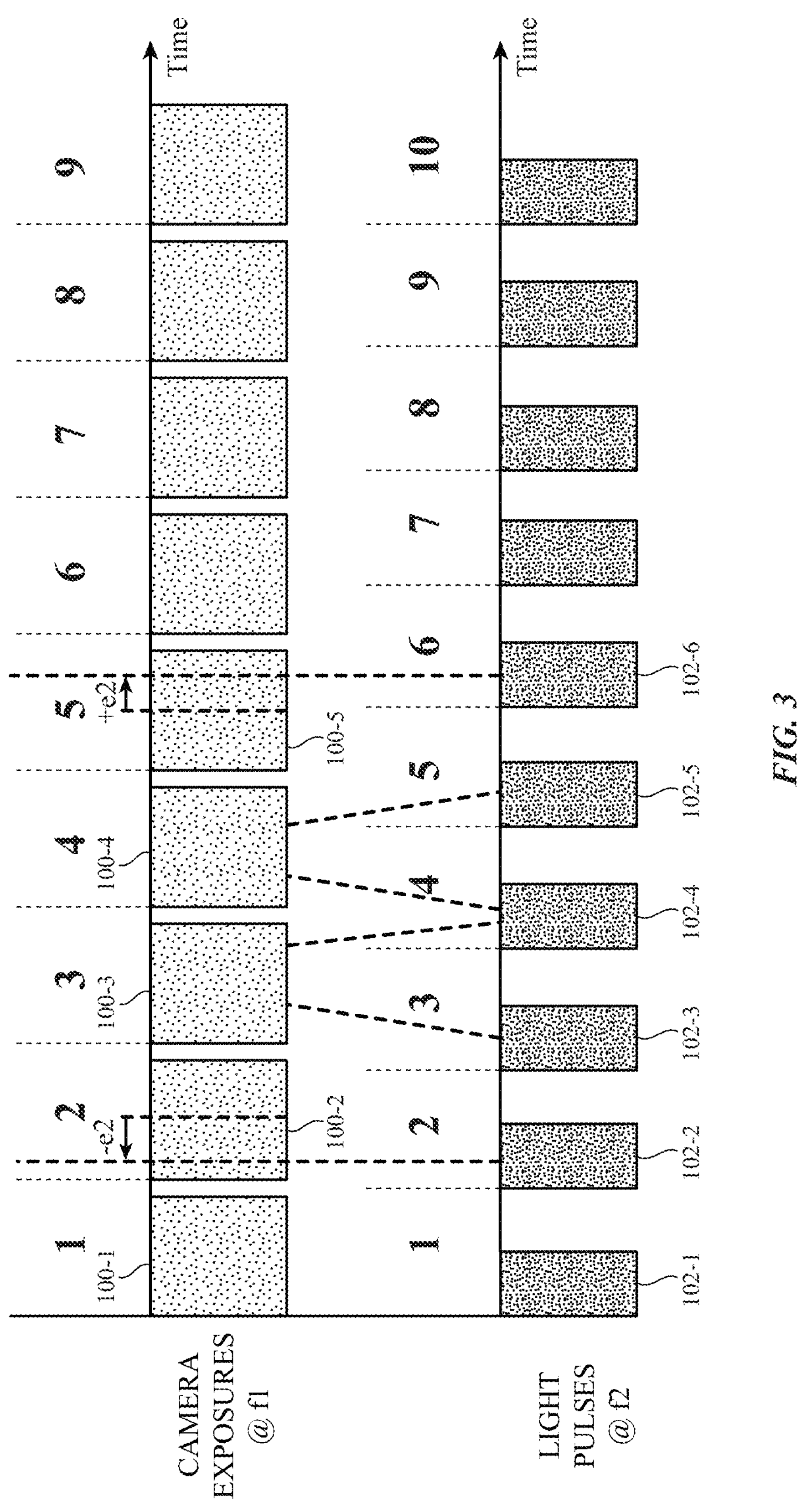
FIG. 3 is a timing diagram illustrating a scenario in which camera exposures are performed at a first frequency and light pulses are emitted at a second frequency different than the first frequency in accordance with an embodiment.

A physical environment, sometimes referred to herein as a "scene," in which device 10 is being operated can include one or more light sources. A light source can exhibit some modulation frequency. In general, scenarios where the frequency of a light source is close to a frame rate of the front-facing camera(s) used to capture a live video feed of the scene can result in strong judder and double images. Judder can refer to or be defined herein as a visual artifact that appears as a noticeable jerkiness or stuttering in the motion of objects on display(s) 14. FIG. 3 is a timing diagram illustrating a scenario in which camera exposures are performed at a first frequency f1 and light pulses are emitted at a second frequency f2 different than the first frequency. Frequency f1 at which the front-facing cameras acquire images of the scene is sometimes referred to as a frame rate, camera frame rate, or camera exposure rate.

As shown in FIG. 3, the front-facing cameras can perform exposures of a given scene at frame rate f1. Here, the given scene can also be illuminated by a light source having light pulsing at a frequency f2. In the example of FIG. 3, the light pulse frequency f2 may be greater than the camera frame rate f1. For instance, the camera frame rate f1 might be equal to 90 Hz, whereas the light pulse frequency f2 might be equal to 100 Hz. FIG. 3 shows nine consecutive exposures (see, e.g., a first exposure period 100-1, a second exposure period 100-2, a third exposure period 100-3, a fourth exposure period 100-4, a fifth exposure period 100-5, and so on) and ten consecutive light pulses (see, e.g., a first light pulse 102-1, a second light pulse 102-2, a third light pulse 102-3, a fourth light pulse 102-4, a fifth light pulse 102-5, a sixth light pulse 102-6, and so on). In this example, the first light pulse 102-1 is aligned with the first camera period 100-1. This relationship, however, changes over time since the light pulse frequency f2 is not equal to camera frame rate f1. For instance, the second light pulse 102-2 already starts before the second camera exposure period 100-2.

Such time or phase shift between the camera exposure periods and the light pulses can be measured using a metric sometimes referred to herein as a time difference (delay) between camera mid-exposure and light mid-emission. An example of this time difference is shown in FIG. 3, where the mid-exposure point of the second exposure period 100-2 occurs after the mid-emission point of the second light pulse 102-2 and thus corresponds to a time difference labeled as −e2. A negative time difference value may indicate that the mid-emission point of a light pulse occurs before the mid-emission point of a corresponding camera exposure period. Conversely, a positive time difference value may indicate that the mid-emission point of a light pulse occurs after the mid-emission point of a corresponding camera exposure period. An example of a positive time difference value is also shown in FIG. 3, where the mid-exposure point of the fifth exposure period 100-5 occurs before the mid-emission point of light pulse 102-6 (see time difference labeled +e5).

Figure 4:
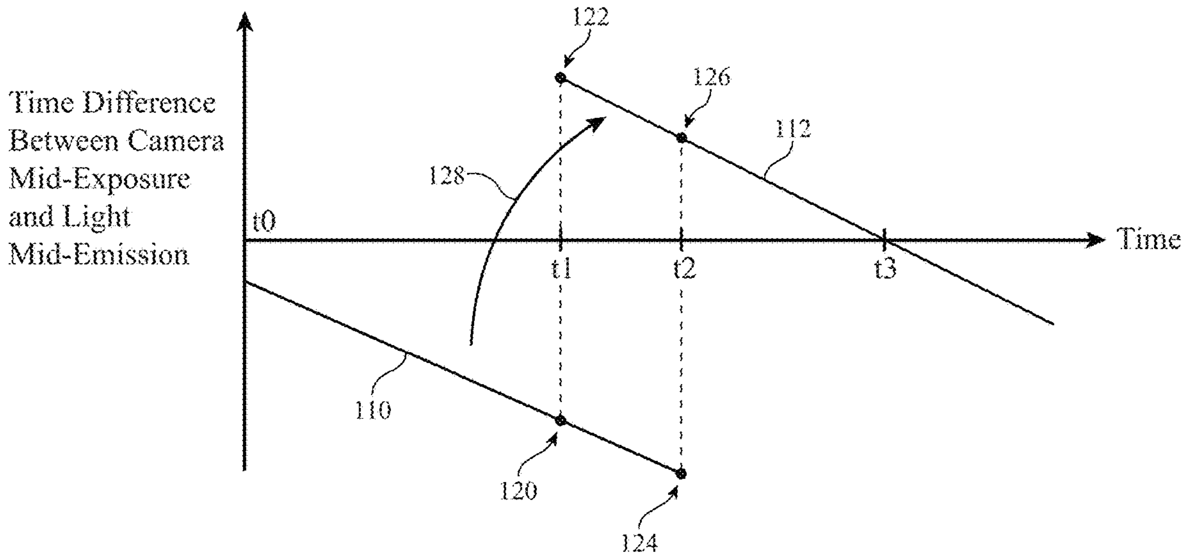
FIG. 4 is a timing diagram plotting a time difference between camera mid-exposure and light mid-emission as a function of time in accordance with some embodiments.

FIG. 4 is a timing diagram plotting such time difference between camera mid-exposure and light mid-emission as a function of time. Line 110 represents negative time difference values from time t0 to t2, with increasing negative values over time as successive light pulses get further ahead of each corresponding camera exposure period. Line 112 represents positive time difference values from time t1 to t3, with decreasing positive values as the trailing light pulses get closer to the mid-exposure point of each corresponding camera exposure period over time. This jump in the time difference between camera mid-exposure and light mid-emission from line 110 to line 112, as indicated by arrow 128, can be perceived by the user as one or more skipped images, image jerkiness, or stuttering sometimes referred to herein as judder. Judder is thus caused by the light source acting as a strobe producing light pulses that are not aligned with the camera frame exposure/capture periods. If an object in the scene being captured and/or if device 10 itself is in constant motion (e.g., if the user is turning or rotating his/her head while operating device 10), then the motion in the resulting image will not be constant. If not mitigated, judder can cause the user to experience motion sickness.

Image ghosting, a visual artifact sometimes referred to as motion blur or image persistence, can also appear or disappear in conjunction with judder. Judder and ghosting are most apparent when the camera frame rate f1 and the frequency of the light source f2 do not match and exhibit a low frequency beat pattern. For example, judder can be most problematic when the absolute value of the difference between f1 and f2 is within the range of 2-25 Hz or when the absolute value of the difference between some multiple of f1 and f2 is within the range of 2-25 Hz. On the other hand, ghosting can be most problematic when the absolute value of the difference between f1 and f2 is within the range of 0-2 Hz or when the absolute value of the difference between some multiple of f1 and f2 is within the range of 0-2 Hz. Note that ghosting can occur even when frequencies f1 and f2 are matched if the phase is offset by 180 degrees. This range of 0-25 Hz is merely illustrative and can be extended beyond 25 Hz. Judder and double images can also be exacerbated when the light source exhibits shorter duty cycles, when the light source exhibits greater (deeper) amplitude modulation, when the camera exposure time is lengthened, and/or when the scene contrast is at higher levels.

As shown in the example of FIG. 4, there can be a time period from time t1 to t2 exhibiting both negative and positive time difference values. For instance, at time t1, point 120 on line 110 produces a negative time difference value, whereas point 122 on line 112 produces a positive time difference value at the same time. This simultaneous double exposure at time t1 is illustrated in FIG. 3, where light pulses 102-3 and 102-4 at least partially overlap with the third camera exposure period 100-3 in time. At time t2, point 124 on line 110 produces another negative time difference value, whereas point 126 on line 112 produces another positive time difference value at the same time. This simultaneous double exposure at time t2 is also illustrated in FIG. 3, where light pulses 102-4 and 102-5 at least partially overlap with the fourth camera exposure period 100-4 in time. Having two separate light pulses during the same camera exposure period can result in the user seeing double images.

Figure 5:
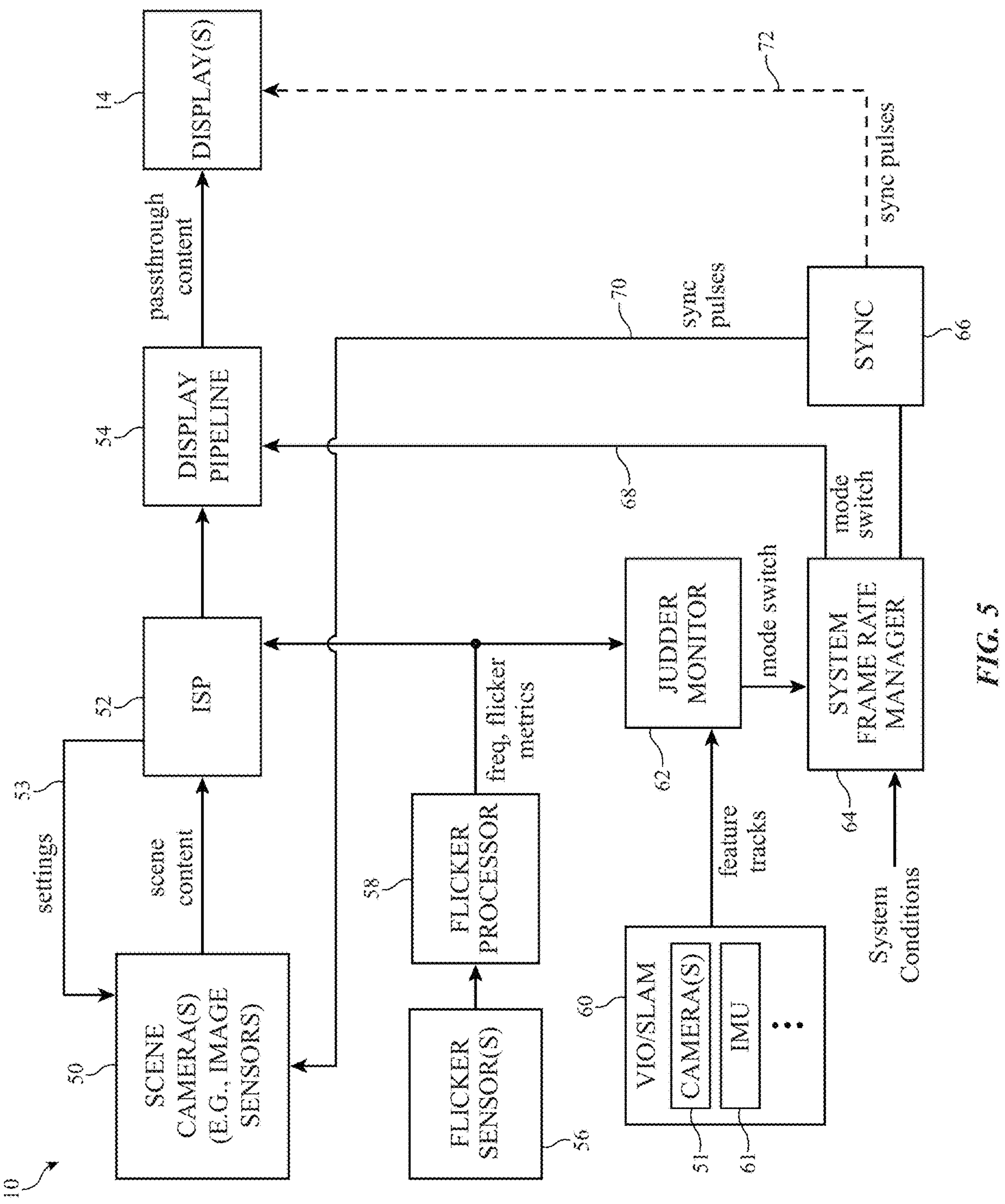
FIG. 5 is a diagram of an illustrative electronic device having hardware and/or software subsystems configured to adjust a system frame rate in response to detecting judder in accordance with some embodiments.

FIG. 5 is a diagram of an illustrative electronic device 10 that is provided with hardware and/or software subsystems configured to adjust a system frame rate to mitigate judder and associated image artifacts in response to detecting judder. As shown in FIG. 5, device 10 may include one or more sensors such as scene cameras 50 and flicker sensor(s) 56, an image signal processor such as image signal processing (ISP) block 52, a display pipeline such as display pipeline 54, one or more display(s) 14, a flicker sensor data processing subsystem such as flicker processor 58, a judder monitoring subsystem such as judder monitor 62, a motion and position determination subsystem such as visual-inertial odometry (VIO) and simultaneous localization and mapping (SLAM) block 60, a system frame rate management subsystem such as system frame rate manager 64, and a synchronization subsystem such as synchronization pulse generator 66.

One or more cameras 50 can be used to gather information on the external real-world environment surrounding device 10. Cameras 50 may include one or more of front-facing cameras 46 of the type shown in FIG. 1. At least some of cameras 50 may be configured to capture a series of images of a scene, which can be processed and presented as a live video passthrough feed to the user using displays 14. The live video passthrough feed is sometimes referred to as video passthrough content. Such front-facing cameras that are employed to acquire passthrough content are sometimes referred to as scene or passthrough cameras. Cameras 50 may include color image sensors and/or optionally monochrome (black and white) image sensors. Cameras 50 can have different fields of view (e.g., some cameras can have a wide or ultrawide field of view, whereas some cameras can have relatively narrower field of view). Not all of cameras 50 need to be used for capturing passthrough content. Some of the cameras 50 may be forward facing (e.g., oriented towards the scene in front of the user); some of the cameras 50 may be downward facing (e.g., oriented towards the user's torso, hands, or other parts of the user); some of the cameras 50 may be side/lateral facing (e.g., oriented towards the left and right sides of the user); and some of the cameras 50 can be oriented in other directions relative to the front face of device 10. All of these cameras 50 that are configured to gather information on the external physical environment surrounding device 10 are sometimes referred to and defined collectively as "external-facing" cameras.

Cameras 50 can be configured to acquire and output raw images of a scene. The raw images output from cameras 50, sometimes referred to herein as scene content, can be processed by image signal processor (ISP) 52. Image signal processing block 52 can be configured to perform image signal processing functions that rely on the input of the raw images themselves. For example, ISP block 52 may be configured to perform automatic exposure for controlling an exposure setting for the passthrough feed, tone mapping, autofocus, color correction, gamma correction, shading correction, noise reduction, black level adjustment, demosaicing, image sharpening, high dynamic range (HDR) correction, color space conversion, and/or other image signal processing functions to output a corresponding processed passthrough feed (e.g., a series of processed video frames). ISP block 52 can be configured to adjust settings of scene cameras 50 such as to adjust a gain, an exposure time, and/or other settings of cameras 50, as illustrated by control path 53. The processed images, sometimes referred to and defined herein as video passthrough content, can be presented as a live video stream/feed to the user via one or more displays 14.

Flicker sensor 56 can represent a dedicated light detector or meter configured to measure and detect variations in the intensity of light, typically caused by fluctuations in the amplitude of one or more light sources in a scene. For example, light sources in the United States (US) are commonly modulated at a frequency of 120 Hz since the alternating current supplied by US power grids typically oscillate at 60 cycles per second. As another example, light sources in European countries are commonly modulated at a frequency of 100 Hz. The raw sensor data output by flicker sensor 56 can be processed using flicker processor 58.

Flicker processor 58 can be configured to analyze the raw sensor data received from flicker sensor 56 and to measure/compute corresponding flicker metrics such as frequency, phase, modulation depth, flicker index (e.g., a metric that considers both the modulation depth and the flicker frequency), a DC or direct current ratio (e.g., a ratio of the energy of constant light to the energy of flickering light), and other related lighting information. The flicker frequency output from flicker processor 58 may represent the frequency of the dominant light source in the physical environment or scene. A scene can include a plurality of light sources. Some of the light sources in the scene can have the same modulation frequency, and some of the light sources can have different modulation frequencies. Flicker sensor 56 senses the overall lighting of the entire scene and can detect the frequency of at least one of the light sources in the environment (e.g., the frequency of a dominant light source). The "dominant light source" can refer to or be defined as the primary or most prevalent light source in a given environment or scene (e.g., the light source with the most significant influence on the overall illumination and color perception in that scene). In some embodiments, flicker sensor 56 might be able to detect the frequency of multiple light sources in the physical environment.

Block 60 can include one or more external-facing camera(s) 51, an inertial measurement unit (IMU) 61, one or more depth/distance sensors, and/or other sensors. Camera(s) 51, which can optionally be part of scene cameras 50, front-facing cameras 46 of FIG. 1, or other external-facing cameras, can be configured to gather visual information on the scene. The inertial measurement unit (IMU) 61 can include one or more gyroscopes, gyrocompasses, accelerometers, magnetometers, other inertial sensors, and other position and motion sensors. The yaw, roll, and pitch of the user's head, which represent three degrees of freedom (DOF), may collectively define a user's orientation. The user's orientation along with a position of the user, which represent three additional degrees of freedom (e.g., X, Y, Z in a 3-dimensional space), can be collectively defined herein as the user's pose. The user's pose therefore represents six degrees of freedom. These position and motion sensors may assume that head-mounted device 10 is mounted on the user's head. Therefore, references herein to head pose, head movement, yaw of the user's head (e.g., rotation around a vertical axis), pitch of the user's head (e.g., rotation around a side-to-side axis), roll of the user's head (e.g., rotation around a front-to-back axis), etc. may be considered interchangeable with references to device pose, device movement, yaw of the device, pitch of the device, roll of the device, etc. In certain embodiments, IMU 61 may also include 6 degrees of freedom (DoF) tracking sensors, which can be used to monitor both rotational movement such as roll, pitch, and yaw and also positional/translational movement in a 3D environment.

Block 60 can include a visual-inertial odometry (VIO) subsystem that combines the visual information from cameras 51, the data from IMU 61, and optionally measurement data from other sensors within device 10 to estimate the motion of device 10. Additionally or alternatively, block 60 can include a simultaneous localization and mapping (SLAM) subsystem that combines the visual information from cameras 50, the data from IMU 61, and optionally measurement data from other sensors within device 10 to construct a 2D or 3D map of a physical environment while simultaneously tracking the location and/or orientation of device 10 within that environment. Configured in this way, block 60 (sometimes referred to as a VIO/SLAM block or a motion and location determination subsystem) can be configured to output motion information, location information, pose/orientation information, and other position-related information associated with device 10 within a physical environment.

In accordance with some embodiments, VIO/SLAM block 60 can also be configured to generate feature tracks. Feature tracks (sometimes also referred to as feature traces) can refer to visual elements that define the structure and appearance of objects in an image such as distinctive patterns, lines, edges, textures, shapes, and/or other visual cues that allow computer vision systems to recognize and differentiate between different objects in a scene. Features tracks can be used as another data point for detecting or monitoring judder during motion of device 10. Feature tracks can thus be used to perform image space judder detection (e.g., judder monitor 62 can determine whether to operate the electronic in the first/default mode or the second mode based on the feature tracks). VIO/SLAM block 60 can optionally include one or more sub-blocks configured to perform feature detection, feature description, and/or feature matching. These feature-related subblocks can be used for both VIO/SLAM functions and for judder detection. Alternatively, judder detection operations can be performed using an optical flow that does not rely on these subblocks of VIO/SLAM block 60.

Judder monitoring block 62 can be configured to receive a frequency of the light source and/or other flicker metrics as computed by flicker processor 58, to optionally receive feature tracks or other motion/positional parameters from block 60, and to determine an amount or severity of judder present in the captured scene content. The frequency and other flicker metrics computed by flicker processor 58 can also be conveyed to ISP block 52 to facilitate in the image processing functions (e.g., notably for auto-exposure functions) at ISP block 52. Based on the received information, judder monitor 62 can be configured to compute a judder severity parameter, sometimes referred to generally as a display artifact severity parameter or factor, that reflects how severe or apparent judder might be in the scene content. A high(er) judder severity parameter may correspond to scenarios where judder, double images, and/or ghosting are likely to result in the user experiencing motion sickness. A low(er) judder severity parameter may correspond to scenarios where judder, double images, and/or ghosting are less likely to result in the user experiencing motion sickness. Thus, when the judder severity parameter computed by judder monitor 62 exceeds a certain threshold (sometimes referred to herein as a judder severity threshold), judder monitor 62 may output a mode switch signal directing device 10 to switch from a first system frame rate to a second system frame rate to help mitigate judder caused by one or more flickering light sources.

The mode switch signal output from judder monitor 62 can be received by system frame rate manager 64. System frame rate manager 64 may be a component responsible for controlling a system frame rate of device 10. The "system frame rate" can refer to the camera frame rate (e.g., the rate at which exposures are being performed by scene cameras 50) and/or the display frame rate (e.g., the rate at which video frames are being output on displays 14). Device 10 may have a unified system frame rate where the camera frame rate is set equal to (or synchronized with) the display frame rate. This is exemplary. If desired, device 10 can optionally be operated using unsynchronized system frame rates where the camera frame rate is not equal to the display frame rate.

System frame rate manager 64 may determine whether to adjust the system frame rate of device 10. System frame rate manager 64 can decide whether to adjust the system frame rate based on the mode switch signal output from judder monitor 62 and/or based on one or more system conditions. For instance, the system conditions can include information about a current user context (or mode) under which device 10 is being operated. Device 10 can be operated in a variety of different extended reality modes. As an example, device 10 can be operated in an immersive media mode during which the user can be presented with movie (cinematic) content, gaming content, or other immersive XR content. As another example, device 10 can be operated in a multiuser communication session mode. Herein, a multiuser communication session refers to a communication session in which two or more devices connected via a network are participating in an extended reality (XR) environment. Some of the electronic devices (and corresponding users) may be located in different physical environments, whereas some of the electronic devices (and corresponding users) in the multiuser communication session may be located in the same physical environment. As another example, device 10 can be operated in a spatial capture mode. The spatial capture mode may employ a recording subsystem that records the content that is currently being displayed by device 10, where the recording can be later played back on device 10 or can be viewable on another device. The immersive (media) mode, the multiuser communication session mode, and the spatial capture mode described above are merely illustrative. Device 10 can be operated under any suitable number of extended reality modes (e.g., a travel mode when sensor data indicates that the user's physical location is moving).

In accordance with some embodiments, system frame rate manager 64 may be restricted from adjusting the system frame rate while device 10 is operated in the immersive media mode or the multiuser communication session mode (e.g., device 10 should not change frame rates during a game or video call). Other system conditions that might affect whether manager 64 adjusts the system frame rate may include an operating temperature of device 10, a power consumption level of device 10, a battery level of device 10, or other operating condition(s) of device 10. Assuming the system conditions allow for a system frame rate adjustment, system frame rate manager 64 may output a mode switch signal to display pipeline 54 via path 68. Display pipeline 54 may generally represent any component for processing the passthrough content between ISP block 52 and display(s) 14. Although display pipeline 54 is illustrated as being separate from ISP block 52 and display(s) 14, any components that are involved in the processing and/or rendering of visual content, including real-world passthrough content or computer-generated virtual content, to be presented on display(s) 14 can be considered part of the display pipeline.

The mode switch signal output from manager 64 may indicate to the display pipeline that device 10 is switching system frame rates. System frame rate manager 64 may direct device 10 to switch between two or more different system frame rates. In a first (default) mode, device 10 may be operated using a first (nominal) system frame rate (e.g., a nominal system frame rate of 90 Hz or 96 Hz). In a second mode, device 10 may be operated using a second system frame rate different than the first system frame rate. As an example, device 10 can be operated using a second system frame rate greater than the nominal system frame rate (e.g., an elevated system frame rate of 100 Hz). As another example, device 10 can be operated using another system frame rate less than the nominal system frame rate (e.g., a system frame rate of 70 Hz or 75 Hz). Adjusting the system frame rates using manager 64 can help mitigate judder, double images, ghosting, and/or other undesirable display artifacts.

System frame rate manager 64 can adjust the system frame rate by controlling synchronization pulse generator 66. Synchronization pulse generator 66 may be configured to generate synchronization pulses such as a first set of synchronization pulses that are conveyed to cameras 50 via path 70 and a second set of synchronization pulses that are conveyed to displays 14 via path 72. The first set of synchronization pulses can set the frame rate or exposure frequency of cameras 50. The second set of synchronization pulses can set the frame rate of displays 14. These synchronization pulses may be clock signals and are sometimes referred to as a system clock. The first and second sets of synchronization pulses can optionally be synchronized to set the camera frame rate equal to the display frame rate. In other words, any adjustment to the system frame rate can impact both the camera frame rate and the display frame rate (e.g., adjusting the system frame rate from 90 Hz to 100 Hz will adjust the camera frame rate and the display frame rate from 90 Hz to 100 Hz).

Figure 6:
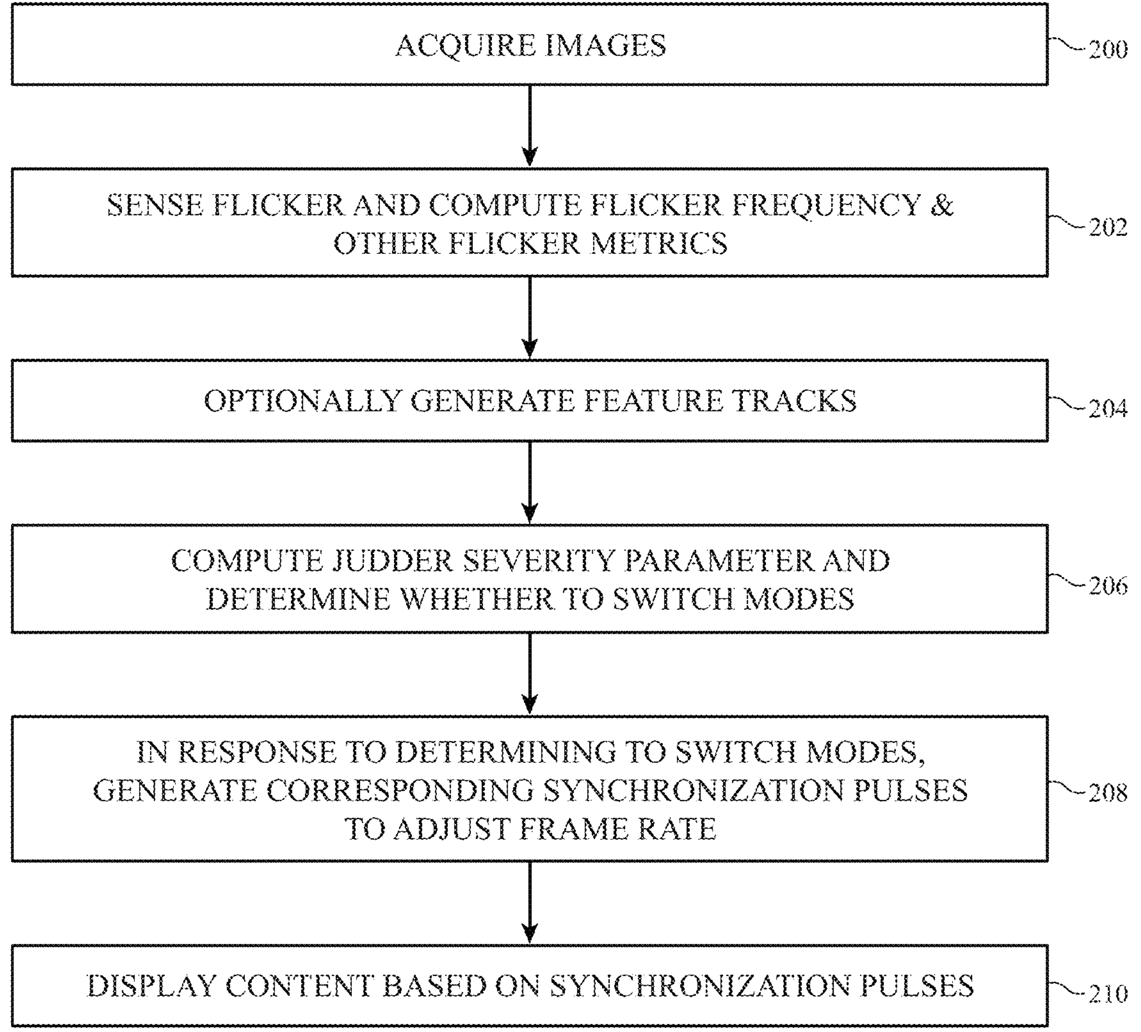
FIG. 6 is a flow chart of illustrative steps for operating an electronic device of the type shown in FIG. 5 in accordance with some embodiments.

FIG. 6 is a flow chart of illustrative steps for operating electronic device 10 of the type described in connection with FIG. 5. During the operations of block 200, images of a scene can be acquired. The images of the scene can be acquired using the scene cameras 50. The images of the scene can sometimes be referred to collectively as scene content.

Figures 7A, 7B:
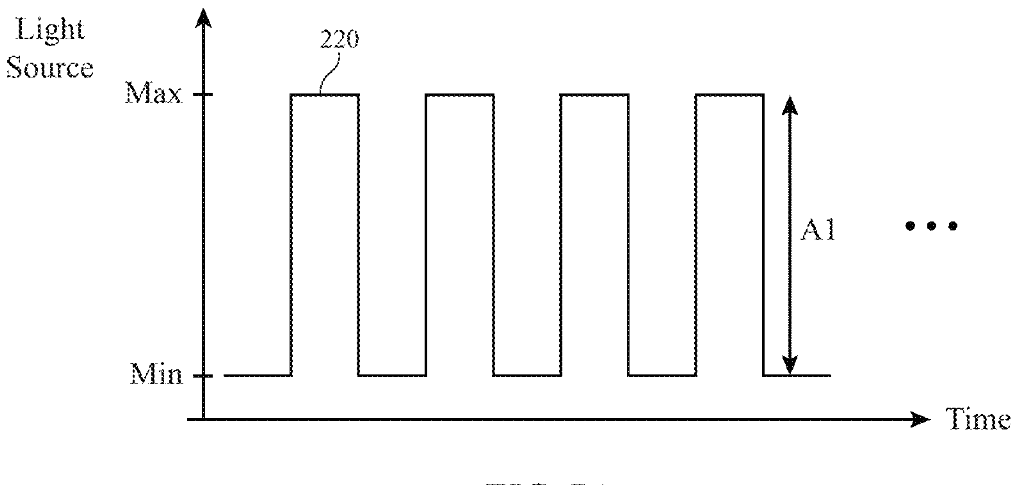
FIG. 7A is a timing diagram illustrating a lighting source with high amplitude modulation in accordance with some embodiments.
FIG. 7B is a timing diagram illustrating a lighting source with low amplitude modulation in accordance with some embodiments.

During the operations of block 202, one or more flicker sensor(s) 56 may be configured to sense a light source in the scene that is likely to result in flicker. Flicker processor 58 or other optical signal processing unit can be configured to detect a corresponding frequency of the detected light source and/or to compute other flicker metrics such as modulation depth, flicker index, DC ratio (e.g., a ratio of the energy of constant light to the energy of flickering light), and other lighting information. Modulation depth may refer to and be defined herein as the degree of intensity variation of a light source over a given period of time. FIG. 7A is a timing diagram illustrating a lighting source with high modulation depth. As shown by waveform 220 in FIG. 7A, the light source can exhibit a first amount of amplitude modulation A1 that is high relative to signal levels in the acquired images. FIG. 7B is a timing diagram illustrating a lighting source with low modulation depth. As shown by waveform 222 in FIG. 7B, the light source can exhibit a first amount of amplitude modulation A2 that is low relative to signal levels in the acquired images. Flicker index can refer to a metric that quantifies the amount of rapid or repeated variation in light intensity of a light source and can be a function of both modulation depth and flicker frequency. Although the operations of block 202 are shown as occurring after the operations of block 200, the operations of block 202 can optionally occur in parallel (simultaneously) with or before the operations of block 200.

During the operations of block 204, feature tracks can optionally be generated based on the acquired images of the scene. For example, block 60 can use the visual information gathered by cameras 51 to generate corresponding feature tracks. Feature tracks can refer to visual elements that define the structure and appearance of objects in an image such as distinctive patterns, lines, edges, textures, shapes, and/or other visual cues that allow computer vision systems to recognize and differentiate between different objects in a scene. Feature tracks can thus be used to perform image space judder detection. If desired, one or more subsystems within VIO/SLAM block 60 can optionally be configured to perform feature detection, feature description, and/or feature matching. The use of one or more subblocks within VIO/SLAM block 60 to perform judder detection operations are illustrative. Although the operations of block 204 are shown as occurring after the operations of block 202, the operations of block 204 can optionally occur in parallel (simultaneously) with or before the operations of block 202. The operations of block 204 are optional and can be omitted or bypassed.

Figure 8:
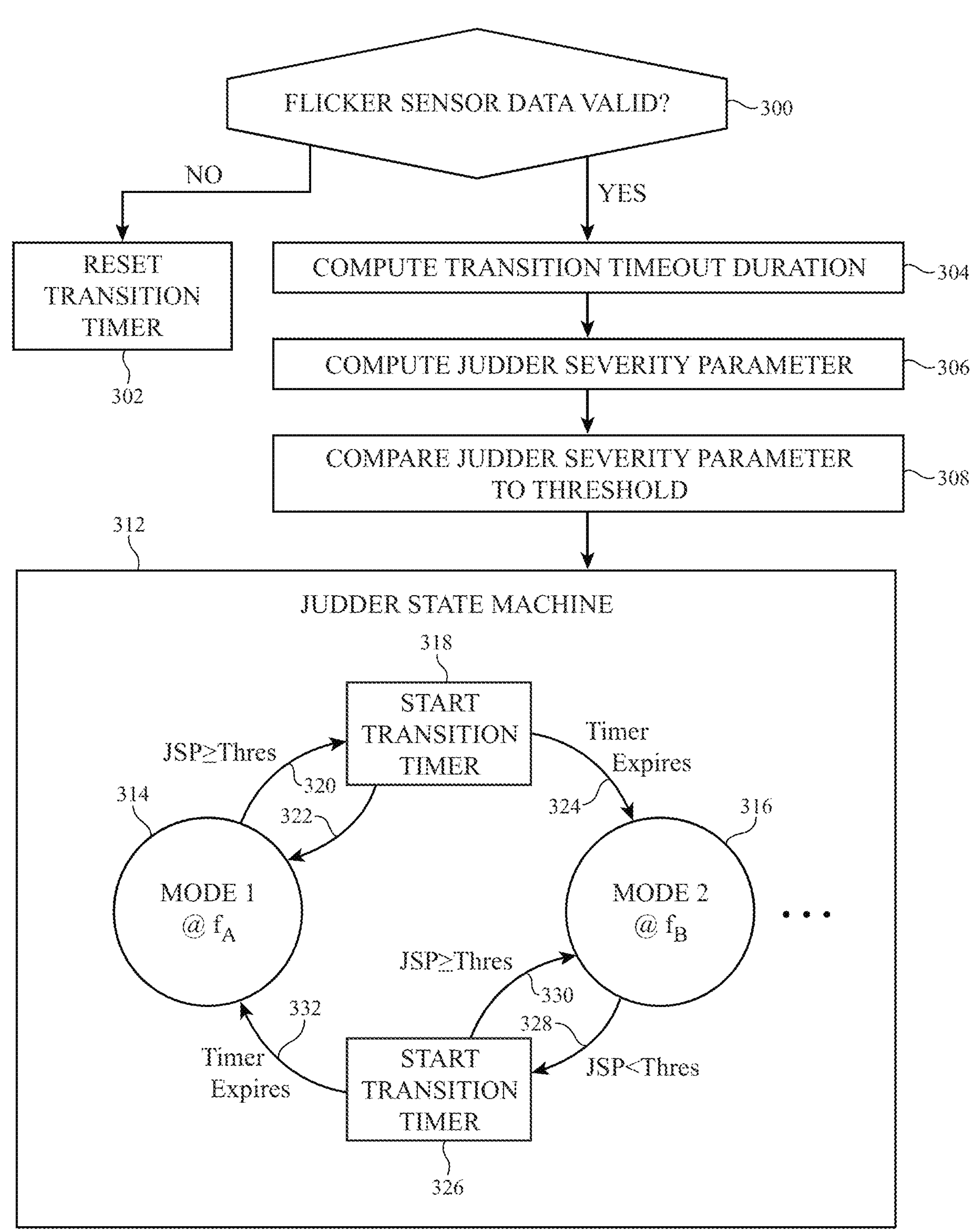
FIG. 8 is a flow chart of illustrative steps involved with monitoring judder in accordance with some embodiments.

During the operations of block 206, a device 10 may determine whether to switch modes for the purpose of mitigating judder. FIG. 8 is a flow chart of illustrative steps involved with monitoring judder and adjusting of device operating modes to mitigate judder. The operations of FIG. 8 can be performed by judder monitoring subsystem 62 of FIG. 5. During the operations of block 300, the data output from flicker sensor(s) 56 can be validated. If the flicker sensor data is not valid (e.g., if no potential flickering light source is detected), then judder monitor 62 can reset a transition timer as shown by the operations of block 302. If the flicker sensor data is valid (e.g., if a light source potentially causing flicker is detected), then judder monitor 62 can compute a transition timeout duration as shown by the operations of block 304.

During the operations of block 306, judder monitor 62 can compute a judder severity parameter. The judder severity parameter can be computed based on the frequency of the light source, flicker index, modulation depth, a duty cycle of the light source, other flicker metrics output from flicker processor 58, camera frame rate or system frame rate, camera exposure times (duration), a level of contrast in the acquired images and other image parameters, a combination of these parameters, and/or other information associated with the scene or captured images. Deep modulation, short duty cycles, longer camera exposure times, frame rates relatively close to the flicker frequency, and scenes with higher contrast tend to result in a high(er) judder severity parameter.

During the operations of block 308, judder monitor 62 can compare the computed judder severity parameter to a certain threshold, sometimes referred to as the judder severity threshold. The result of such comparison can dictate the operation of a judder state machine such as state machine 312 that determines whether or not to switch device operating modes for the purpose of mitigating judder. Judder state machine 312 shows how device 10 may be operable in two or more modes such as modes 314 and 316. When operated in the first mode 314, device 10 can exhibit a first (nominal or default) system frame rate $f_A$. For example, the first system frame rate $f_A$ can be equal to 90 Hz, 96 Hz, 80-97 Hz, 80-90 Hz, 90-97 Hz, or other suitable frequency. When operated in the second mode 316, device 10 can exhibit a second system frame rate $f_B$. For example, the second system frame rate $f_B$ can be equal to 100 Hz, 99-101 Hz, 98-102 Hz, 97-103 Hz, 120 Hz, 119-121 Hz, 118-122 Hz, 117-123 Hz, 70-75 Hz, 65-80 Hz, or other suitable frequency depending on the frequency of the flicker-causing light source. In general, the value of system frame rate $f_B$ can be chosen such that some multiple of $f_B$ is not within 2-25 Hz of the flicker frequency or such that $f_B$ is not within 2-25 Hz of some integer ratio of the flicker frequency. This range of 2-25 Hz is merely illustrative and can be extended beyond 25 Hz or less than 2 Hz. For example, second frequency $f_B$ can be set equal to an integer ratio of the frequency of the light source (e.g., frame rate f can be set equal to the flicker frequency divided by some integer n). For instance, if the frequency of the light source is 200 Hz, then the frame rate $f_B$ can be set to 100 Hz, assuming n is equal to 2. When device 10 is operated in mode 316, the exposure time (duration) of the scene cameras 50 can optionally be lowered as a function of flicker frequency to reduce static banding that would otherwise move across the frame. If desired, a spatially varying gain can also be applied to the acquired images to compensate for static banding.

The example of FIG. 8 showing device 10 being adjusted between two different modes exhibiting frequencies $f_A$ and $f_B$ is illustrative. If desired, device 10 can further be operable in additional modes employing system frame rates different than $f_A$ and $f_B$.

Judder monitor 62 may consider transitioning device 10 from mode 314 to mode 316 when the judder severity parameter (JSP) exceeds a judder severity threshold (see arrow 320). A judder severity parameter that exceeds such threshold may be indicative of a scenario in which the scene/passthrough content exhibits an amount of judder, double images, and/or ghosting that is likely to result in the user experiencing motion sickness. In response to the judder severity parameter exceeding the threshold, the transition timer can start (see operations of block 318). The transition timer may count down from the transition timeout (expiration) duration computed from block 304. If, before the transition timer expires (e.g., counts down from the timeout duration to zero), the judder severity parameter falls below the threshold, device 10 should remain at mode 314 (as indicated by arrow 322). If, however, the transition timer expires without the judder severity parameter falling below the threshold (as indicated by arrow 324), judder monitor 62 may output a corresponding mode switch signal for switching device 10 to mode 316. Switching modes to adjust system frame rates in this way can be technically advantageous and beneficial to mitigate or reduce judder, double images, ghosting, and/or other undesirable display artifacts associated with flicker.

Device 10 can remain in mode 316 as long as the judder severity parameter remains above the threshold. Judder monitor 62 may consider transitioning device 10 from mode 316 back to mode 314 when the judder severity parameter falls below the judder severity threshold (see arrow 328). A judder severity parameter that falls below such threshold may be indicative of a scenario in which the scene/passthrough content exhibits a relatively low amount of judder, double images, and/or ghosting that is unlikely to result in the user experiencing motion sickness. In response to the judder severity parameter dipping below the threshold, the transition timer can start anew (see operations of block 326). The transition timer may count down from the transition timeout (expiration) duration computed from block 304. If, before the transition timer expires (e.g., counts down from the timeout duration to zero), the judder severity parameter exceeds the threshold, device 10 should remain at mode 316 (as indicated by arrow 330). If, however, the transition timer expires without the judder severity parameter rising above the threshold (as indicated by arrow 332), judder monitor 62 may output a corresponding mode switch signal for switching device 10 back to mode 314.

Referring back to block 208 of FIG. 6, synchronization pulses can then be generated. For example, system frame rate manager 64 can control pulse generator 66 to output corresponding synchronization pulses that set the frame rate of cameras 50 and the frame rate of displays 14. In other words, the frequency at which the synchronization pulses are output from block 66 can set the frame rate of cameras 50 and the frame rate of displays 14. The scene content being captured by cameras 50 may be captured based on a frame rate that is a function of the synchronization pulses received from block 66. The passthrough content being presented on displays 14 may be output based on a frame rate that is a function of the synchronization pulses received from block 66, as shown by the operations of block 210.

The operations of FIG. 6 are illustrative. The various scene cameras 50 being used to capture scene content for judder mitigation can have different fields of view (e.g., overlapping and even non-overlapping fields of view). For cameras 50 with different fields of view, the judder mitigation operations of FIG. 6 can be performed separately or independently for improved algorithmic performance. If desired, device 10 can optionally include multiple flicker sensors 56 for independently sensing flickering light for the various cameras 50 with different fields of view. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 9A:
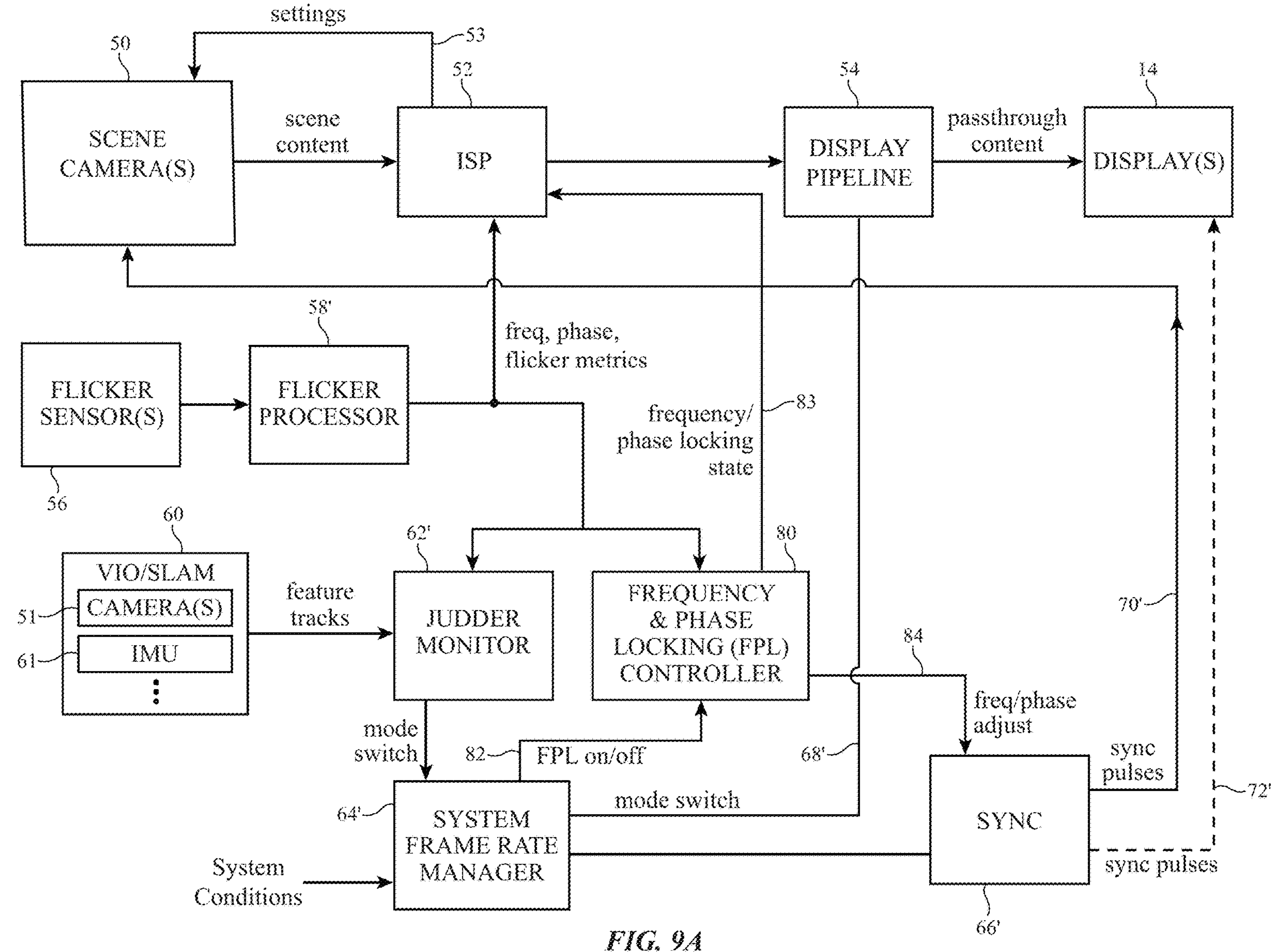
FIG. 9A is a diagram of an electronic device having hardware and/or software subsystems configured to perform frequency and phase locking in response to detecting judder in accordance with some embodiments.

The embodiment described in connection with FIGS. 5-8 in which device 10 adjusts the system frame rate in response to detecting judder and other potentially problematic display artifacts is exemplary and is not intended to limit the scope of the present embodiments. FIG. 9A illustrates another embodiment of electronic device 10 that includes hardware and/or software subsystems configured to mitigate judder by locking the frequency and/or phase of a system clock to the frequency and/or phase of a detected flicker-causing light source. A "system clock" may refer to and be defined herein as a clock signal that sets the system frame rate of device 10 (e.g., a clock signal that determines the camera frame rate and/or the display frame rate).

As shown in FIG. 9A, device 10 may include one or more sensors such as scene cameras 50 and flicker sensor(s) 56, image signal processing (ISP) block 52, display pipeline 54, one or more display(s) 14, flicker processor 58', a judder monitoring subsystem such as judder monitor 62', a motion and position determination subsystem such as visual-inertial odometry (VIO) and simultaneous localization and mapping (SLAM) block 60, a system frame rate management subsystem such as system frame rate manager 64', a synchronization subsystem such as synchronization pulse generator 66', and an additional controller such as frequency and phase locking (FPL) control block 80. The scene cameras 50, ISP block 52, display pipeline 54, display(s) 14, flicker sensor(s) 56, and VIO/SLAM block 60 shown in FIG. 9A have the same structure and functionality as that already described in connection with FIG. 5 and need not be reiterated in detail to avoid obscuring the present embodiment.

Flicker processor 58' can be configured to analyze the raw sensor data received from flicker sensor 56 and to measure/compute corresponding flicker metrics such as frequency, phase, modulation depth, flicker index, DC ratio, and/or other related lighting information. A physical environment can be illuminated by one or more light sources. The frequency output from flicker processor 58' may represent the frequency of the dominant light source in the physical environment or scene. The phase output from flicker processor 58' may represent the phase of the dominant light source in the scene. If desired, flicker sensor 56 can sense the overall lighting of the scene and detect the frequency and phase of each of the light sources, including the frequency of the dominant light source (e.g., flicker sensor 56 can have a different output for each light source detected within the scene).

Judder monitoring block 62' can be configured to receive the frequency, phase, and/or other flicker metrics as computed by flicker processor 58', to optionally receive feature tracks or other motion/positional parameters from block 60, and to determine a degree or severity of judder present in the captured scene content. The frequency and other flicker metrics computed by flicker processor 58' can also be conveyed to ISP block 52 to facilitate in the image processing functions at ISP block 52. Based on the received information, judder monitor 62' can be configured to compute a judder severity parameter (or factor) that reflects how severe or apparent judder might be in the scene content. A high(er) judder severity parameter may correspond to scenarios where judder, double images, and/or ghosting are likely to result in the user experiencing motion sickness. Thus, when the judder severity parameter computed by judder monitor 62' exceeds a certain threshold (sometimes referred to herein as a judder severity threshold), judder monitor 62' may output a mode switch signal directing device 10 to adjust the frequency and/or phase of the system clock to help mitigate judder caused by one or more flickering light sources.

The mode switch signal output from judder monitor 62' can be received by system frame rate manager 64'. System frame rate manager 64' may be a component responsible for controlling a system frame rate of device 10. The "system frame rate" can refer to the camera frame rate (e.g., the rate at which exposures are being performed by scene cameras 50) and/or the display frame rate (e.g., the rate at which video frames are being output on displays 14). Device 10 may have a unified system frame rate where the camera frame rate is set equal to (or synchronized with) the display frame rate. This is exemplary. If desired, device 10 can optionally be operated using unsynchronized system frame rates where the camera frame rate is not equal to the display frame rate.

System frame rate manager 64' may determine whether to adjust the system frame rate of device 10. System frame rate manager 64' can decide whether to adjust the system frame rate based on the mode switch signal output from judder monitor 62' and/or based on one or more system conditions. For instance, the system conditions can include information about a current user context (or mode) under which device 10 is being operated. As examples, device 10 can be operated in a variety of different extended reality modes, including but not limited to an immersive media mode, a multiuser communication session mode, a spatial capture mode, and a travel mode, just to name a few.

In accordance with some embodiments, system frame rate manager 64' may be restricted from adjusting the frequency and/or phase of the system clock while device 10 is operated in the immersive media mode or the multiuser communication session mode (e.g., device 10 should not change frame rates during a game or video call). Other system conditions that might affect whether manager 64' adjusts any attributes associated with the system clock may include an operating temperature of device 10, a power consumption level of device 10, a battery level of device 10, or other operating condition(s) of device 10. Assuming the system conditions allow for some kind of adjustment to the system clock signal, system frame rate manager 64' may output a mode switch signal to display pipeline 54 via path 68 for indicating to the display pipeline that device 10 is adjusting the system clock. The mode switch signal output from judder monitor 62' may direct device 10 to operate in at least two different modes such as a first (default) mode and a second mode configured to mitigate judder, double images, ghosting, and other undesired display artifacts. The second mode is therefore sometimes referred to as a judder-mitigation mode.

System frame rate manager 64' may be configured to selectively activate and deactivate the frequency and phase locking controller 80 (e.g., by sending an activation or deactivation command to controller 80 via path 82). For example, in response to receiving a mode switch signal from judder monitor 62' directing device 10 to switch from the first (default) mode to the second (judder-mitigation) mode, system frame rate manager 64' may activate the frequency and phase locking controller 80. When device 10 is operated in the judder-mitigation mode, the exposure time (duration) of the scene cameras 50 can optionally be lowered as a function of flicker frequency to reduce static banding that would otherwise move across the frame. If desired, a spatially varying gain can also be applied to the acquired images to compensate for static banding. In response to receiving a mode switch signal from judder monitor 62' directing device 10 to switch from the judder-mitigation mode back to the default mode, system frame rate manager 64' may deactivate the frequency and phase locking controller 80.

Frequency and phase locking controller 80 may be configured to receive the frequency, phase, and/or other flicker metrics as computed by flicker processor 58'. When activated, frequency and phase locking controller 80 may output frequency and phase adjustment signals to synchronization block 66'. Frequency and phase locking controller 80 can also send frequency and phase locking state information to ISP block 52, as shown by data path 83. The frequency and phase adjustment signals output from FPL controller 80 ensures that the system clock has a frequency that is locked to (e.g., set equal to an integer ratio) the frequency of the detected (flicker-causing) light source and/or a phase that is locked (aligned) to the phase of the detected light source. For example, if the flicker frequency is 200 Hz, the system clock can be locked to 100 fps, 66.67 fps, 50 fps, 40 fps, etc. When deactivated, frequency and phase locking controller 80 may not output any frequency and phase adjustment signals to synchronization block 66'.

Synchronization pulse generator 66' may be configured to generate synchronization pulses such as a first set of synchronization pulses that are conveyed to cameras 50 via path 70' and a second set of synchronization pulses that are conveyed to displays 14 via path 72'. The first set of synchronization pulses can set the frame rate or exposure frequency of cameras 50. The second set of synchronization pulses can set the frame rate of displays 14. The first and second sets of synchronization pulses can optionally be synchronized to set the camera frame rate equal to the display frame rate. The first and second set of synchronization pulses can be referred to collectively as the "system clock." When activated, FPL controller 80 can send the frequency and phase adjustment signals to block 66' and in response, block 66' can output synchronization pulses (system clock) at a frequency that is equal (locked) to the frequency of the detected light source and having a phase that is aligned (locked) to the phase of the detected light source. For example, "phase locking" can refer to or be defined herein as aligning the center (mid) point of each emitted light signal to the center (mid) point of each corresponding camera exposure period. In other words, the exposure periods of cameras 50 can be shifted based on the phase of the sensed light as computed by flicker processor 58'. Configurations in which FPL controller 80 performs frequency and phase locking are illustrative. In other embodiments, FPL controller 80 can be configured to perform frequency locking without phase locking (e.g., the system clock can have a frequency matching the frequency of the flicker-causing light source but can exhibit a phase that is not necessarily aligned to the phase of that light source).

Figure 9B:
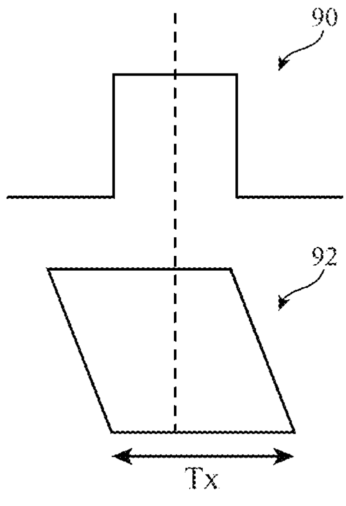
FIGS. 9B and 9C are timing diagrams showing how exposure time can be reduced relative to a light pulse in accordance with some embodiments.

FIG. 9B is a timing diagram illustrating a scenario where the system frame rate, including at least the camera frame rate, is phased locked to the light pulse of a flicker-causing light source. As shown in FIG. 9B, light pulse 90 of the flicker-causing light source may have a frequency $f_{flicker}$, and the camera exposure 92 can have a rolling shutter scheme, where each line has an exposure time period duration Tx that begins at least one row readout time after the start of exposure of the previous line. In the example of FIG. 9B, the camera exposure time period duration Tx might be greater than a pulse width of light pulse 90.

Figure 9C:
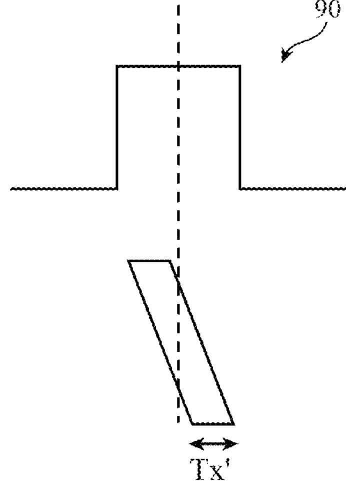

In certain situations, such as when device 10 is in motion (e.g., due to the user turning his/her head), the corresponding captured image can exhibit undesired blur due to the motion of device 10. In such scenarios, device 10 can leverage the phase locking technique to actively reduce the duration of the camera exposure to be less than the period of light pulse 90 (e.g., to reduce the exposure time duration Tx to be less than a reciprocal of the flicker frequency). The reduction of exposure time duration Tx' is shown in FIG. 9C. Operated in this way, motion blur can be reduced without introducing flicker when phase locking is enabled. This technique in which the camera exposure time duration is adjusted or lowered when head motion is detected is sometimes referred to as "motion based adaptive exposure." This technique can also be applied to mitigate flicker for a scene with bright light (e.g., when capturing an image of an environment with one or more bright sources of light that can potentially cause flicker).

Low exposure times can sometimes introduce static banding depending on the readout time and waveform. Thus, in some embodiments, static banding compensation can be applied to the corresponding image based on a prediction from the flicker sensor or by measuring a required gain map using two or more different camera frames with varying exposure times. Slow readout times can aggravate brightness changes caused by abrupt changes in exposure times. Thus, motion based adaptive exposure with phase locking can generally benefit from faster readout times, such as readout times that are shorter than the preceding exposure times. Moreover, locking mid-exposure times to the middle of the flicker causing light pulses (see, e.g., FIG. 9C) can also be technically advantageous and beneficial to ensure accurate phase locking under abrupt exposure time changes.

Figure 10:
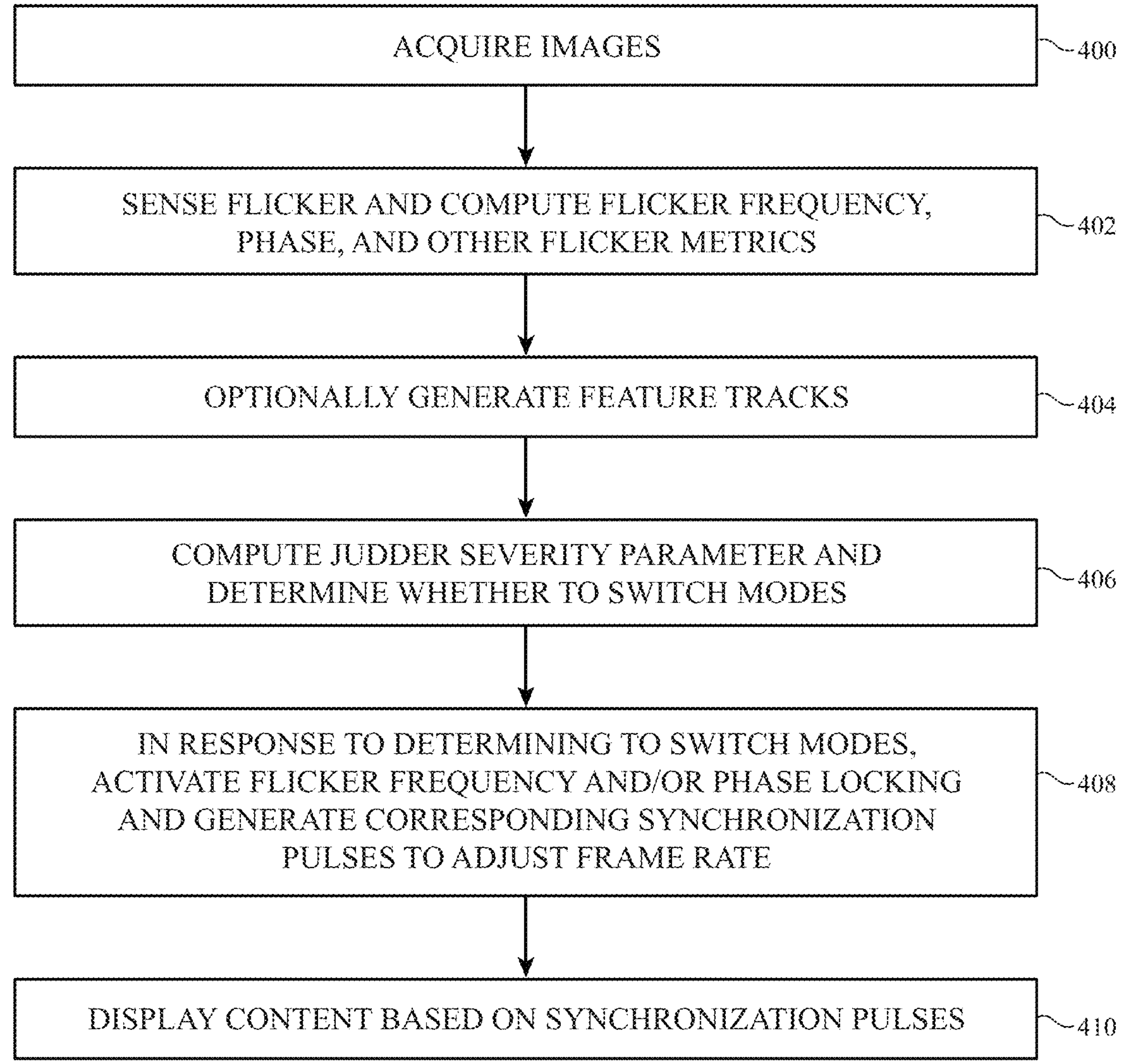
FIG. 10 is a flow chart of illustrative steps for operating an electronic device of the type shown in FIG. 9A in accordance with some embodiments.

FIG. 10 is a flow chart of illustrative steps for operating electronic device 10 of the type described in connection with FIG. 9A. During the operations of block 400, images of a scene can be acquired. The images of the scene can be acquired using the scene cameras 50 or other front-facing or external-facing image sensors. The acquired images of the scene can sometimes be referred to collectively as scene content.

During the operations of block 402, one or more flicker sensor(s) 56 may be configured to sense a light source in the scene that is likely to result in flicker. Flicker processor 58' or other optical signal processing unit can be configured to detect a corresponding frequency of the detected light source, a phase of the detected light source, and/or to compute other flicker metrics such as modulation depth, flicker index, DC ratio (e.g., a ratio of the energy of constant light to the energy of flickering light), and/or other lighting information. Although the operations of block 402 are shown as occurring after the operations of block 400, the operations of block 402 can optionally occur in parallel (simultaneously) with or before the operations of block 400.

During the operations of block 404, feature tracks can optionally be generated based on the acquired images of the scene. For example, VIO/SLAM block 60 can use the visual information gathered by cameras 50 or 51 to generate corresponding feature tracks. Feature tracks can refer to visual elements that define the structure and appearance of objects in an image such as distinctive patterns, lines, edges, textures, shapes, and/or other visual cues that allow computer vision systems to recognize and differentiate between different objects in a scene. Feature tracks can thus be used to perform image space judder detection (e.g., judder monitor 62' can determine whether to operate the electronic in the first/default mode or the second/judder-mitigation mode based on the feature tracks). Although the operations of block 404 are shown as occurring after the operations of block 402, the operations of block 404 can optionally occur in parallel (simultaneously) with or before the operations of block 402. The operations of block 404 are optional and can be omitted or bypassed.

During the operations of block 406, a device 10 may determine whether to switch modes for the purpose of mitigating judder. During block 406, the data output from flicker sensor(s) 56 can be validated. If the flicker sensor data is not valid (e.g., if no potential flickering light source is detected), then judder monitor 62' can reset a transition timer. If the flicker sensor data is valid (e.g., if a light source potentially causing flicker is detected), then judder monitor 62' can compute a transition timeout duration. Judder monitor 62' can then compute a judder severity parameter, sometimes referred to generally as a display artifact severity parameter or factor. The judder severity parameter can be computed based on the frequency of the light source, a phase of the light source, flicker index, modulation depth, a duty cycle of the light source, other flicker metrics output from flicker processor 58, camera frame rate or system frame rate, camera exposure times (duration), a level of contrast in the acquired images and other image parameters, a combination of these parameters, and/or other information associated with the scene or captured images.

Judder monitor 62' can then compare the computed judder severity parameter to a certain threshold, sometimes referred to as the judder severity threshold. The result of such comparison can determine whether to switch from a first (default) mode during which FPL controller is deactivated and a second (judder-mitigation) mode during which FPL controller is activated (see operations of block 408). The actual mechanism for transitioning between these two modes can be similar to that already described in connection with FIG. 8, where a transition timer and expiration is monitored to ensure that judder is persisting for a certain time duration before proceeding with a mode switch decision.

During the operations of block 408, synchronization pulses can be generated. For example, system frame rate manager 64' can control pulse generator 66' to output corresponding synchronization pulses that set the frame rate of cameras 50 and the frame rate of displays 14. In other words, the frequency at which the synchronization pulses are output from block 66' can set the frame rate of cameras 50 and the frame rate of displays 14. If flicker and phase locking controller 80 is activated, controller 80 can send corresponding frequency and/or phase adjustment signals to block 66', which can cause block 66' to generate a system clock having synchronization pulses with a frequency locked to the frequency of the light source as determined by flicker processor 58' and a phase locked to the phase of the light source as determined by flicker processor 58'. The scene content being captured by cameras 50 may be captured based on a frame rate that is a function of the synchronization pulses received from block 66'. The pass-through content being presented on displays 14 may be output based on a frame rate that is a function of the synchronization pulses received from block 66', as shown by the operations of block 410. In other words, FPL controller 80 can selectively output frequency and phase adjustment signals that control the system clock for adjusting the system frame rate of device 10. Operating device 10 is this way can be technically advantageous and beneficial to mitigate or reduce judder, double images, ghosting, and/or other problematic display artifacts associated with a flicker-causing light source.

The operations of FIG. 10 are illustrative. The various scene cameras 50 being used to capture scene content for judder mitigation can have different fields of view (e.g., overlapping and even non-overlapping fields of view). For cameras 50 with different fields of view, the judder mitigation operations of FIG. 10 can be performed separately or independently for improved algorithmic performance. If desired, device 10 can optionally include multiple flicker sensors 56 for independently sensing flickering light for the various cameras 50 with different fields of view. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 11:
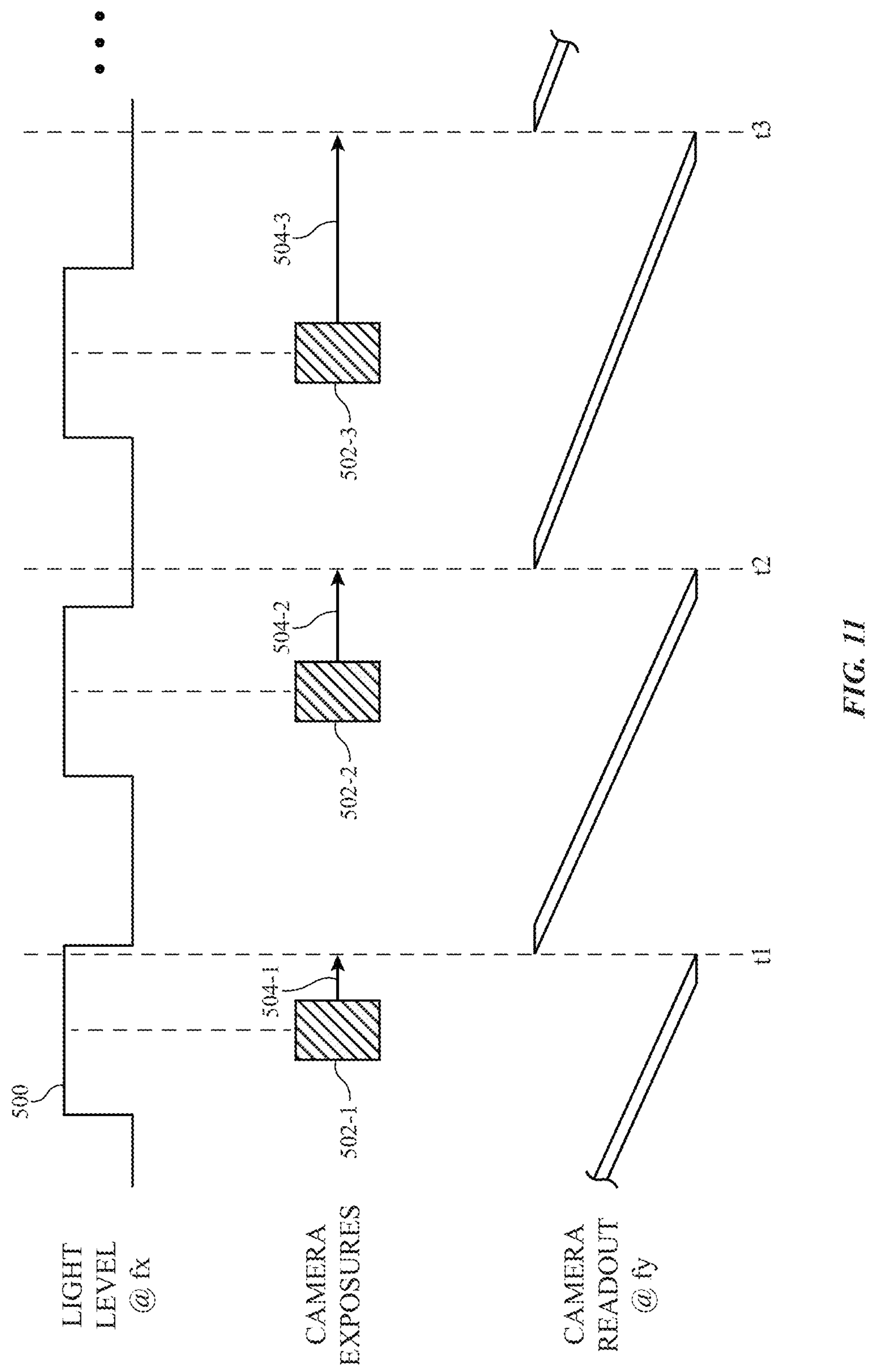
FIGS. 11 and 12 are timing diagrams illustrating how camera exposures can be phase aligned to peaks of a light source in accordance with some embodiments.

At least some of the techniques described above in connection with the embodiments of FIGS. 5-10 rely on the ability to adjust the frame rate to match the frequency of the flicker-causing light source. In certain situations, it may not be possible or desirable to adjust or change the system frame rate. In such scenarios, a different technique for mitigating flicker is provided that involves phase locking the camera exposure periods to certain portions of the flicker-causing light source. FIG. 11 is a timing diagram showing an illustrative operation where camera exposures are phase aligned to peaks of a light source. As shown in FIG. 11, waveform 500 represents the light level of a potential flicker-causing light source with a frequency fx, whereas images captured by one or more scene cameras can be read out at a camera frame or readout rate fy. The camera readout rate fy may be different than frequency fx of the light source. In the example of FIG. 1, the camera readout (frame) rate fy is less than the light source frequency fx. This is illustrative. In other scenarios, the camera readout rate fy might be equal to or greater than the light source frequency fx. Waveform 500 can be sensed using flicker sensor 56 or other light sensors in device 10.

In accordance with an embodiment, the camera exposure periods may be aligned to the centers or peaks of waveform 500. The centers or peaks of waveform 500 can be identified using flicker processor (e.g., by determining the phase of waveform 500). In the example of FIG. 11, the mid-exposure point of a first camera exposure period 502-1 may be aligned to the center of a first light pulse in waveform 500, the mid-exposure point of a second subsequent exposure period 502-2 may be aligned to the center of a second light pulse in waveform 500, the mid-exposure point of a third subsequent exposure period 502-3 may be aligned to the center of a third light pulse in waveform 500, and so on. While the camera frames can be read out on a row-by-row basis, as illustrated by the scan-type readout shown in FIG. 11, this technique relies on the camera exposures being obtained using one or more global shutter image sensor. In other words, one or more scene cameras 50 in FIG. 5 or 9 can be implemented as global shutter image sensors.

Assuming the light source frequency fx is not equal to the camera frame/readout rate fy and assuming it is currently not possible or desirable to match fy to fx, then aligning the mid-exposure point of each global sensor exposure period 502 to the center/peak of each light pulse may require the capability of independently adjusting the phase of each camera exposure period relative to the corresponding readout operation for that frame (e.g., the timing of the exposure operation and the readout operation has to be decoupled from one another). This can be achieved by independently delaying or shifting the camera readout operation relative to each exposure period by a different amount. In the example of FIG. 11, the readout operation starting at time t1 corresponding to the first image capture may be delayed relative to the first exposure period 502-1 by a first delay amount 504-1. The readout operation starting at time t2 corresponding to the second capture may be delayed relative to the second exposure period 502-2 by a second delay amount 504-2 different than the first delay amount 504-1. The readout operation starting at time t3 corresponding to the third capture may be delayed relative to the third exposure period 502-3 by a third delay amount 504-3 different than the second delay amount 504-2, and so on. In other words, the camera exposure cadence may be variable (e.g., the exposure-to-readout delays 504 are variable and tunable). Shifting or phase-locking the camera exposure periods to peaks of the flicker-causing light source in this way can be technically advantageous and beneficial to help mitigate flicker and/or judder. This technique also allows for flicker mitigation in circumstances when the flicker period is greater than the exposure time and/or when the light source waveform exhibits a pulse width that is greater than a duration of each of the sensor exposure periods. The example of FIG. 11 illustrates a scenario in which the readout time is equal to the frame period. If desired, the readout time can be shorter than the frame period.

Figure 12:
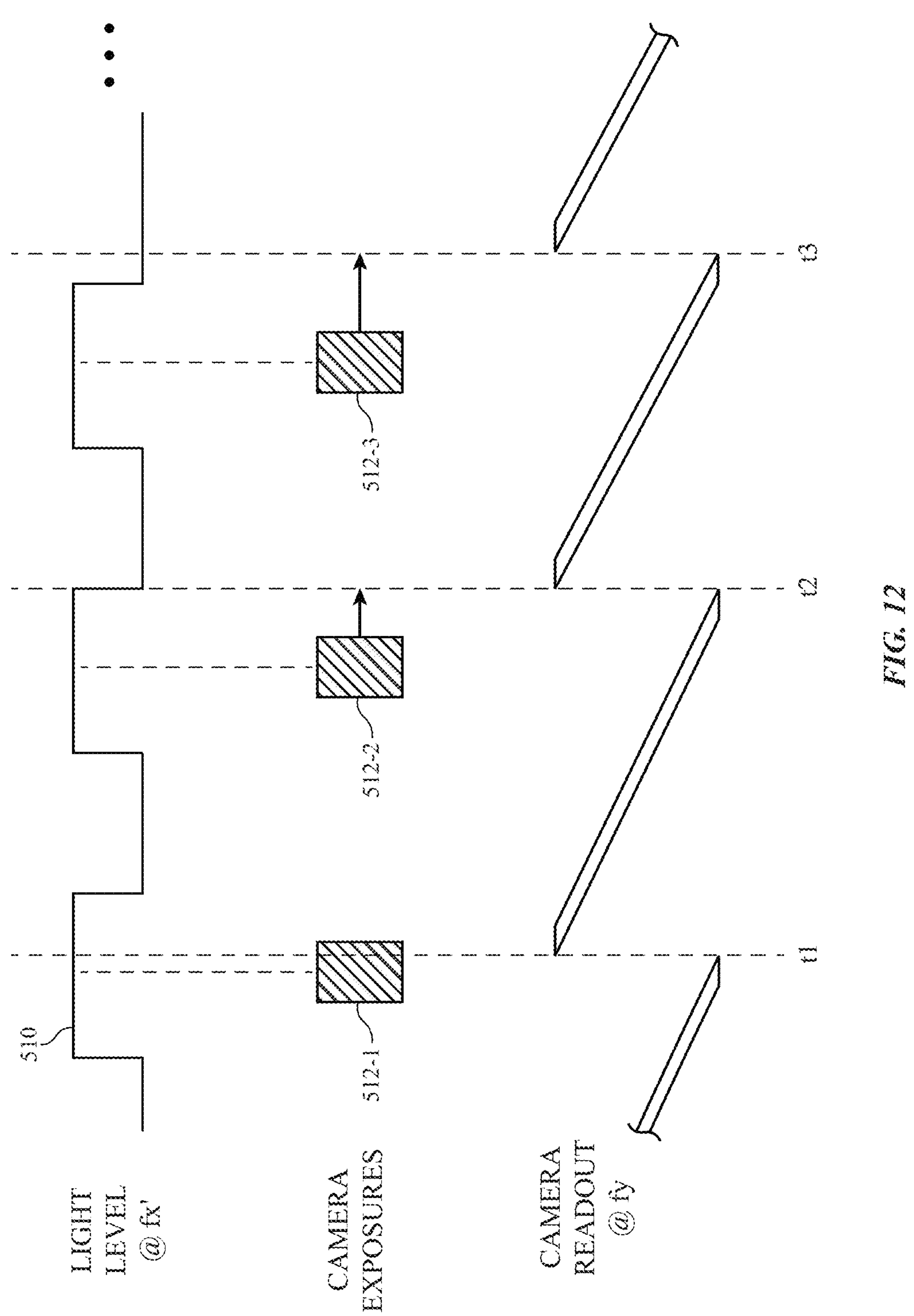

Aligning the camera exposure periods to the peaks of the light source can have certain requirements. As an example, the waveform of the light source might need to have a period that is at least equal to the camera frame/readout period plus at least half of the camera exposure period. This effectively sets an exposure time limit. FIG. 12 illustrates an example where the light source has a frequency fx' corresponding to waveform 510 with a period that is less than the camera frame period plus half the camera exposure period. As shown in FIG. 12, the mid-exposure point of a first camera exposure period 512-1 may be aligned to the center of a first light pulse in waveform 510, the mid-exposure point of a second subsequent exposure period 512-2 may be aligned to the center of a second light pulse in waveform 510, the mid-exposure point of a third subsequent exposure period 512-3 may be aligned to the center of a third light pulse in waveform 510, and so on. Here, it can be seen that the first camera exposure period 512-1 will be blocked since exposure 512-1 will not have been completed prior to the requisite frame readout starting at time t1. In such scenarios, a shorter global shutter camera exposure period may be employed.

Figure 13:
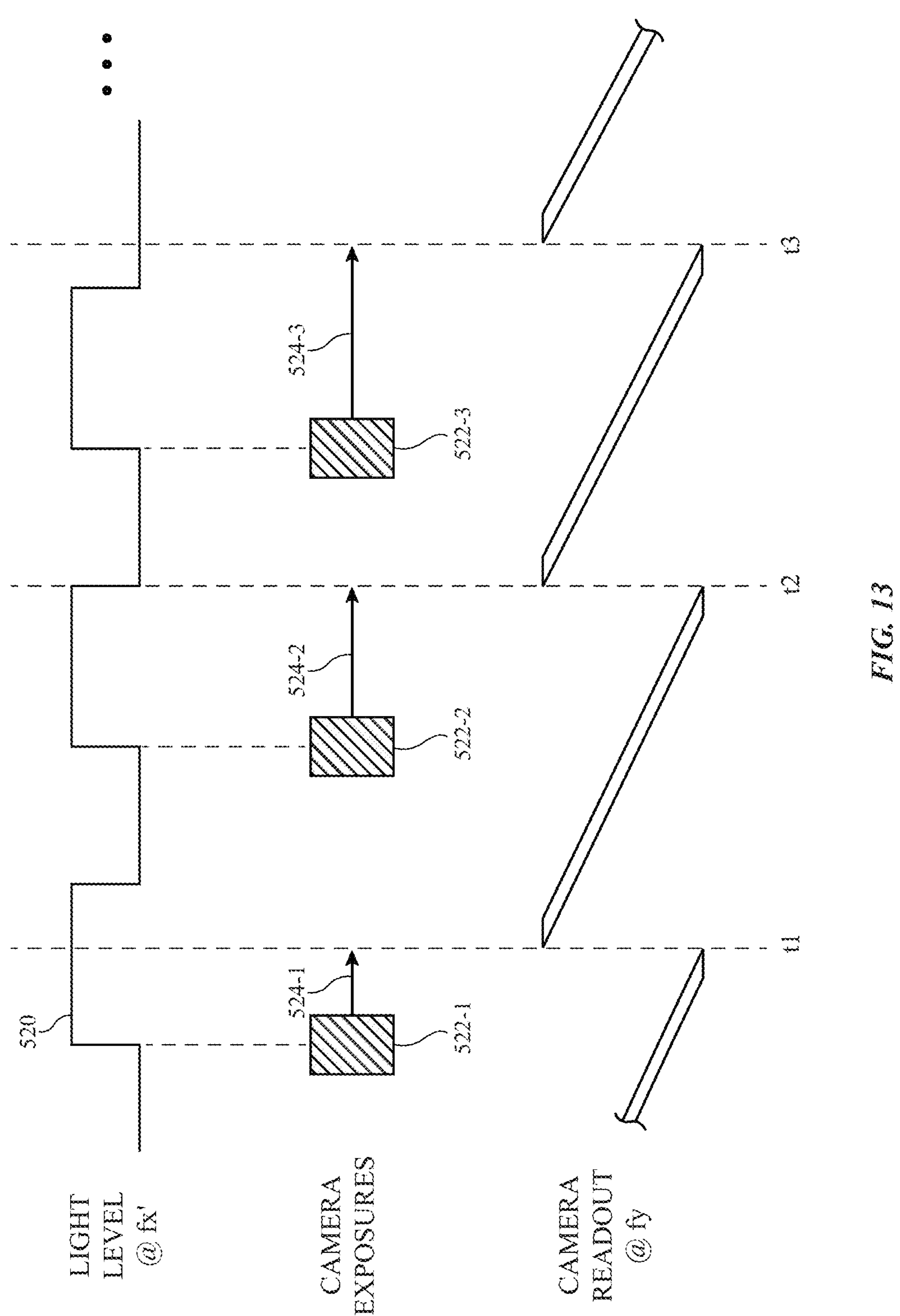
FIG. 13 is a timing diagram illustrating how camera exposures can be phase aligned to edges of a light source in accordance with some embodiments.

To help alleviate such timing requirements, FIG. 13 illustrates a different technique in which the camera exposure periods are phase aligned to edges of a flicker-causing light source with waveform 520. Waveform 520 can be sensed using flicker sensor 56 or other light sensors in device 10. The edges of waveform 520 can be identified using flicker processor 58 or 58' (e.g., by determining the phase of waveform 520). In the example of FIG. 13, the mid-exposure point of a first camera exposure period 522-1 may be aligned to the rising edge of a first light pulse in waveform 520, the mid-exposure point of a second subsequent exposure period 522-2 may be aligned to the rising edge of a second light pulse in waveform 520, the mid-exposure point of a third subsequent exposure period 522-3 may be aligned to the rising edge of a third light pulse in waveform 520, and so on. While the camera frames can be read out on a row-by-row basis, as illustrated by the scan-type readout shown in FIG. 13, this technique relies on the camera exposures being obtained using one or more global shutter image sensor. The example of FIG. 13 in which the mid-exposure point of each successive camera exposure periods is aligned to a corresponding rising edge of the light source is illustrative. In other embodiments, the camera exposure periods can alternatively be phase aligned to falling and/or rising edges of the light source. Targeting the middle of each edge can provide the most leeway to change the camera exposure without having to change the relative timing of frames on the rising and falling edges.

Assuming the light source frequency fx' is not equal to the camera frame/readout rate fy and assuming it is currently not possible or desirable to match fy to fx', then aligning the mid-exposure point of each global sensor exposure period 522 to the rising edge of each light pulse may require the capability of independently adjusting the phase of each camera exposure period relative to the corresponding readout operation for that frame (e.g., the timing of the exposure operation and the readout operation has to be decoupled from one another). This can be achieved by independently delaying or shifting the camera readout operation relative to each exposure period by a different amount. In the example of FIG. 13, the readout operation starting at time t1 corresponding to the first image capture may be delayed relative to the first exposure period 522-1 by a first delay amount 524-1. The readout operation starting at time t2 corresponding to the second capture may be delayed relative to the second exposure period 522-2 by a second delay amount 524-2 different than the first delay amount 524-1. The readout operation starting at time t3 corresponding to the third capture may be delayed relative to the third exposure period 522-3 by a third delay amount 524-3 different than the second delay amount 524-2, and so on. In other words, the camera exposure cadence may be variable (e.g., the exposure-to-readout delays 524 are variable and tunable).

Aligning the camera exposure periods to edges of the light source waveform in the way shown in FIG. 13 might only require the waveform of the light source to have a period that is at least equal to half of the camera frame/readout period plus half of the camera exposure period, which delivers the same exposure time at half the flicker frequency. Aligning exposure for constant brightness can be challenging, especially when waveform 520 is not symmetrical around the peaks. Shifting or phase-locking the camera exposure periods to peaks of the flicker-causing light source in this way can be technically advantageous and beneficial to help mitigate flicker and/or judder.

Figure 14:
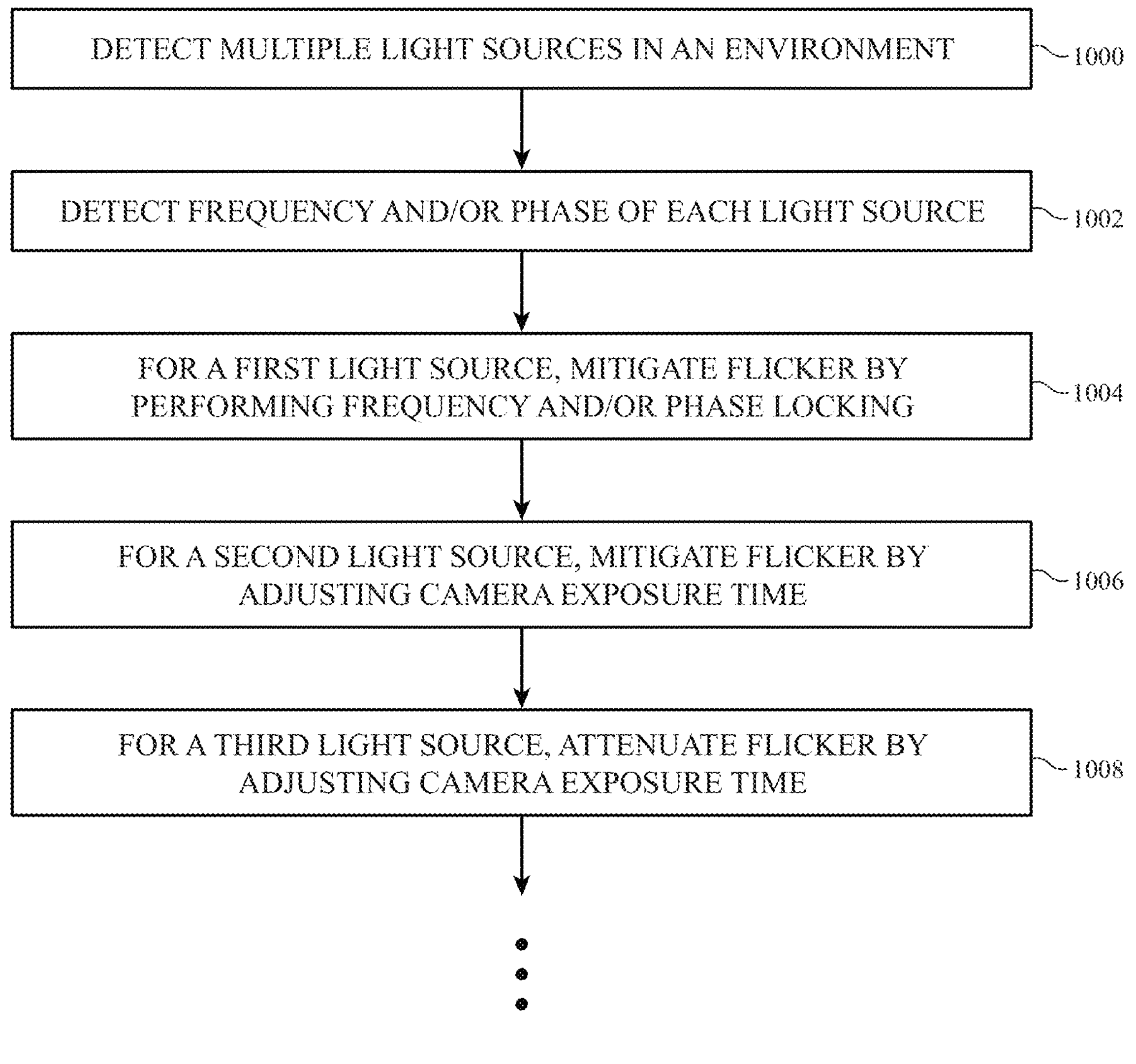
FIG. 14 is a flow chart of illustrative steps for performing mixed flicker mitigation operations in accordance with some embodiments.

Some physical environments can include multiple light sources. For example, a scene in which device 10 is being operated can include two or more different light sources, three or more different light sources, or four or more different sources of light. Each of the different light sources in a scene can exhibit a different frequency and/or phase. In such scenarios, device 10 can be configured to separately compensate or mitigate flicker for one or more of the various light sources in the scene. A scene that includes multiple light sources is sometimes referred to as a mixed lighting environment. FIG. 14 is a flow chart of illustrative steps for performing mixed flicker mitigation operations.

During the operations of block 1000, device 10 may be configured to detect multiple light sources in a physical environment. For example, device 10 can employ flicker sensor 56 (see, e.g., FIG. 5 or FIG. 9A) to detect the presence of two or more light sources in the environment surrounding device 10. The environment can include three or more light sources, four or more light sources, or more than five sources of light. Each of the various light sources in the scene can exhibit the same frequency or different frequencies and/or can exhibit the same phase or different phases.

During the operations of block 1002, device 10 may be configured to detect the frequency and/or phase of two or more light sources in the environment. For example, device 10 can employ flicker processor 58' (FIG. 9A) to measure/compute corresponding flicker metrics such as the frequency, phase, modulation depth, flicker index, DC ratio, and/or other related lighting information for each of the detected light sources in the environment. Flicker processor 58' can optionally measure multiple frequencies and at least one phase (e.g., processor 58' can measure at least the phase of the dominant light source or the phase of the second most dominant light source in the scene).

During the operations of block 1004, device 10 can be configured to mitigate flicker associated with a first light source in the environment by performing frequency and/or phase locking operations. In one embodiment, device 10 can perform the operations described in connection with FIGS. 5-6 to adjust the system frame rate based on the frequency of the first light source. In another embodiment, device 10 can perform the operations described in connection with FIGS. 9-10 to perform frequency and/or phase locking based on the frequency and/or frequency of the first light source. The system frame rate can optionally be locked to the detected frequency of the first light source divided by N, where N represents a positive integer. For example, the system frame rate can be adjusted to 90 Hz to mitigate flicker for a 180 Hz light source. The frequency/phase locking operations of block 1004 can be employed when other flicker mitigation techniques would result in overly exposed frames.

During the operations of block 1006, device 10 can be configured to mitigate flicker associated with a second light source in the environment by adjusting an exposure time of one or more of the scene cameras (see, e.g., image sensors 46 in FIG. 1, image sensors 50 in FIG. 5, or image sensors 50 in FIG. 9A). In one embodiment, device 10 can adjust the camera exposure time (duration) to be equal to M times the flicker period, where M represents a positive integer and where the flicker period is equal to a reciprocal of the frequency of the second light source. For example, the camera exposure time can be set equal to 8 milliseconds to compensate flicker for a 250 Hz light source (e.g., 8 ms=1/250*2, where M is equal to 2). Although block 1006 is shown as occurring after block 1004, the operations of block 1006 can optionally be given priority when possible to compensate flicker.

During the operations of block 1008, device 10 can be configured to mitigate flicker associated with a third light source in the environment by adjusting the camera exposure time. In some embodiments, device 10 can adjust the camera exposure time (duration) to be approximately equal to M times the flicker period, where M represents a positive integer and where the flicker period is equal to a reciprocal of the frequency of the third light source. For example, the camera exposure time can be set equal to approximately 10 milliseconds to compensate flicker for a 300 Hz light source (e.g., 10 ms=1/300*3, where M is equal to 3). The operations of block 1008 can help attenuate flicker of the third light source (e.g., flicker resulting from the third light source can be reduced but still might be visible).

In general, the method described in connection with FIG. 14 can be extended to mitigate flicker for any number of light sources in a scene. The first light source, the second light source, or the third light source in the example of FIG. 14 can represent the dominant light source. The determination of whether to mitigate flicker associated with a particular light source via frequency/phase locking or exposure time adjustment can depend on a variety of factors.

The methods and operations described above in connection with FIGS. 1-14 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 2). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A method of operating an electronic device comprising:
with one or more image sensors, acquiring images of a scene;
with one or more displays, outputting the acquired images of the scene;
with a flicker sensor, sensing light in the scene;
obtaining a frequency of the sensed light; and
setting a frame rate of the one or more image sensors as a function of the frequency of the sensed light.

2. The method of claim 1, further comprising:
setting a frame rate of the one or more displays based on the frequency of the sensed light.

3. The method of claim 1, further comprising:
obtaining a phase of the sensed light; and
shifting exposure periods of the one or more image sensors based on the phase of the sensed light.

4. The method of claim 3, further comprising:
adjusting a duration of the exposure periods based on the frequency of the sensed light to reduce banding in the images being output on the one or more displays or to reduce blur caused by motion of the electronic device in the images being output on the one or more displays.

5. The method of claim 4, wherein adjusting the duration of the exposure periods based on the frequency of the sensed light comprises reducing the duration of the exposure periods to be less than a reciprocal of the frequency of the sensed light.

6. The method of claim 3, further comprising:
computing a display artifact severity parameter based on the frequency and the phase of the sensed light; and
determining whether to operate the electronic device in a first mode or a second mode by comparing the display artifact severity parameter to a threshold.

7. The method of claim 6, further comprising:
operating the electronic device in the first mode during which the frame rate of the one or more image sensors is different than the frequency of the sensed light; and
operating the electronic device in the second mode during which the frame rate of the one or more image sensors is locked to the frequency of the sensed light and during which a phase of the exposure periods of the one or more image sensors is locked to the phase of the sensed light.

8. The method of claim 6, wherein computing the display artifact severity parameter comprises computing a judder severity parameter based on measurement data that includes one or more of: the frequency of the sensed light, the phase of the sensed light, a flicker index of the sensed light, a modulation depth of the sensed light, a duty cycle of the sensed light source, the frame rate of the one or more image sensors, and a duration of the exposure periods of the one or more image sensors.

9. The method of claim 6, further comprising:
analyzing at least some of the acquired images to obtain corresponding feature tracks; and
determining whether to operate the electronic device in the first mode or the second mode based on the feature tracks.

10. A method of operating an electronic device comprising:
with one or more image sensors, acquiring images of a scene;
with one or more displays, outputting the acquired images of the scene;
with a flicker sensor, sensing light in the scene;
obtaining a frequency of the sensed light;
computing a display artifact severity parameter based on at least the frequency of the sensed light and comparing the display artifact severity parameter to a threshold; and
in response to determining that the display artifact severity parameter exceeds the threshold, mitigating judder when outputting the acquired images with the one or more displays by adjusting a frame rate of the one or more image sensors.

11. The method of claim 10, wherein computing the display artifact severity parameter comprises computing a judder severity parameter based on measurement data that includes one or more of: the frequency of the sensed light, a phase of the sensed light, a flicker index of the sensed light, a modulation depth of the sensed light, a duty cycle of the sensed light source, the frame rate of the one or more image sensors, and a duration of exposure periods associated with the one or more image sensors.

12. The method of claim 10, further comprising:
in response to determining that the display artifact severity parameter exceeds the threshold, adjusting a frame rate of the one or more displays.

13. The method of claim 10, further comprising:
adjusting a duration of exposure periods of the one or more image sensors based on the frequency of the sensed light to reduce banding in the images being output on the one or more displays.

14. The method of claim 10, further comprising:
in response to determining that the display artifact severity parameter is less than the threshold, operating the electronic device in a first mode during which the frame rate of the one or more image sensors is set to a first frequency; and
in response to determining that the display artifact severity parameter is greater than the threshold, operating the electronic device in a second mode during which the frame rate of the one or more image sensors is set to a second frequency that is different than the first frequency.

15. The method of claim 14, wherein the second frequency is equal to an integer ratio of the frequency of the sensed light.

16. The method of claim 14, further comprising:
analyzing at least some of the acquired images to obtain corresponding feature traces; and
determining whether to operate the electronic device in the first mode or the second mode based on the feature traces.

17. A method of operating an electronic device, comprising:

with a flicker sensor, sensing light in a scene, the light exhibiting a waveform having a first frequency;

with one or more image sensors, acquiring images of the scene by aligning sensor exposure periods to certain portions of the waveform; and reading out the images from the one or more image sensors at a second frequency that is asynchronous with the first frequency.

18. The method of claim 17, wherein aligning the sensor exposure periods to certain portions of the waveform comprises aligning the sensor exposure periods to peaks of the waveform.

19. The method of claim 17, wherein aligning the sensor exposure periods to certain portions of the waveform comprises aligning the sensor exposure periods to rising or falling edges of the waveform.

20. The method of claim 17, wherein the waveform exhibits a pulse width that is greater than a duration of each of the sensor exposure periods, and wherein the second frequency is less than the first frequency.

21. The method of claim 17, wherein the one or more image sensors comprise one or more global shutter image sensors, and wherein reading out the images from the one or more image sensors comprises reading out the images on a row-by-row basis.

22. A method of operating an electronic device, comprising:

with one or more image sensors, acquiring images of a scene illuminated by a first light source and a second light source;

with one or more displays, outputting the acquired images of the scene;

detecting a frequency of the first light source in the scene;

detecting a frequency of the second light source in the scene;

mitigating flicker associated with the first light source by performing an operation of a first type; and mitigating flicker associated with the second light source by performing an operation of a second type different than the first type.

23. The method of claim 22, wherein performing the operation of the first type comprises adjusting a frame rate of the one or more image sensors based on the detected frequency of the first light source.

24. The method of claim 22, wherein performing the operation of the first type comprises performing frequency and phase locking operations based on the detected frequency and a phase of the first light source.

25. The method of claim 22, wherein performing the operation of the second type comprises adjusting an exposure time of the one or more image sensors based on the detected frequency of the second light source.

26. The method of claim 22, further comprising:

detecting a frequency of a third light source in the scene; and mitigating flicker associated with the third light source by performing an operation of the first type or the second type.

* * * * *